US008220750B2

(12) United States Patent
Hettwer

(10) Patent No.: US 8,220,750 B2
(45) Date of Patent: Jul. 17, 2012

(54) INFRARED COMMUNICATION POWER DRIVE UNIT AND METHOD FOR ACTIVATING SAME IN AN AIRCRAFT CARGO LOADING SYSTEM

(75) Inventor: Peter Nicholas Hettwer, West Fargo, ND (US)

(73) Assignee: Goodrich Corporation, Charlotte, NC (US)

( * ) Notice: Subject to any disclaimer, the term of this patent is extended or adjusted under 35 U.S.C. 154(b) by 1281 days.

(21) Appl. No.: 11/939,207

(22) Filed: Nov. 13, 2007

(65) Prior Publication Data

US 2009/0121084 A1 May 14, 2009

(51) Int. Cl.
*B64C 1/20* (2006.01)

(52) U.S. Cl. ................................................. 244/137.1

(58) Field of Classification Search ............... 244/118.1, 244/137.1; 198/611, 782, 788, 789, 573, 198/781.01, 781.05, 358, 570; 160/309–310; 414/533–534; 318/445, 400.4; 364/463, 364/567; 340/679, 680, 686.3
See application file for complete search history.

(56) References Cited

U.S. PATENT DOCUMENTS

| | | | | |
|---|---|---|---|---|
| 4,006,869 | A | * | 2/1977 | Vogele .................. 244/137.1 |
| 5,101,962 | A | | 4/1992 | Pritchard |
| 5,661,384 | A | | 8/1997 | Glibbery |
| 5,716,028 | A | | 2/1998 | Evans et al. |
| 5,760,703 | A | | 6/1998 | Becker |
| 6,328,154 | B1 | * | 12/2001 | Huber .................. 198/782 |
| 6,867,702 | B2 | | 3/2005 | Huber et al. |
| 7,014,038 | B2 | | 3/2006 | Leingang et al. |
| 7,109,677 | B1 | | 9/2006 | Gagnon et al. |
| 7,199,543 | B1 | | 4/2007 | Hettwer |
| 2002/0030156 | A1 | | 3/2002 | Smith et al. |
| 2007/0138343 | A1 | | 6/2007 | Hettwer |

FOREIGN PATENT DOCUMENTS

WO   WO 2004/098995   11/2004

OTHER PUBLICATIONS

German Office Action dated Jun. 29, 2011 issued in counterpart German application No. 10 2008 052 432.8 (with translation).

* cited by examiner

*Primary Examiner* — Tien Dinh
(74) *Attorney, Agent, or Firm* — Womble Carlyle

(57) ABSTRACT

An air cargo loading system also includes a controller, a main control panel and a plurality of PDUs (PDUs), at least the controller and the PDUs being connected by a wired network. Each PDU has a motor, at least one driver roller element coupled to said motor, a light source, a light detector, and a processor. The light detector of each PDU is configured to receive and process an incoming coded light signal from a wireless remote control handset. The PDU's processor determines whether the received coded light signal is a valid command signal and, if so, provides a command information signal to the controller via the wired network. The controller decodes the command information signal and, in view of its knowledge of container locations, various switch settings and other status information, the controller then sends the appropriate control signals to turn on the required PDUs in response thereto. Because wireless remote handsets are used to communicate with the controller, the air cargo system may either be wholly devoid of local control panels or, have only a very small number of local control panels.

12 Claims, 18 Drawing Sheets

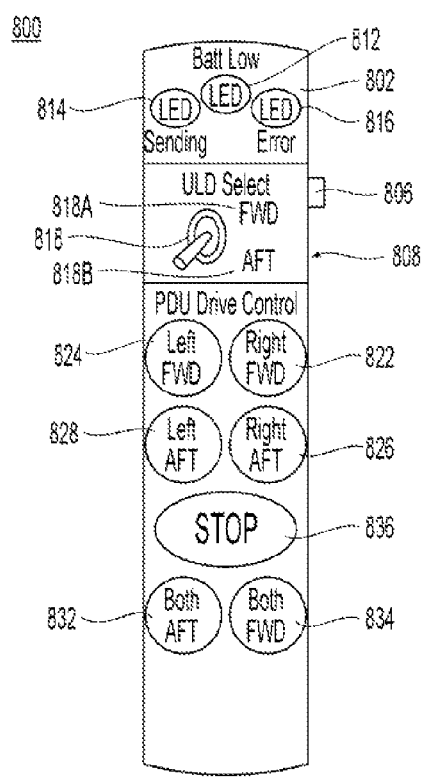
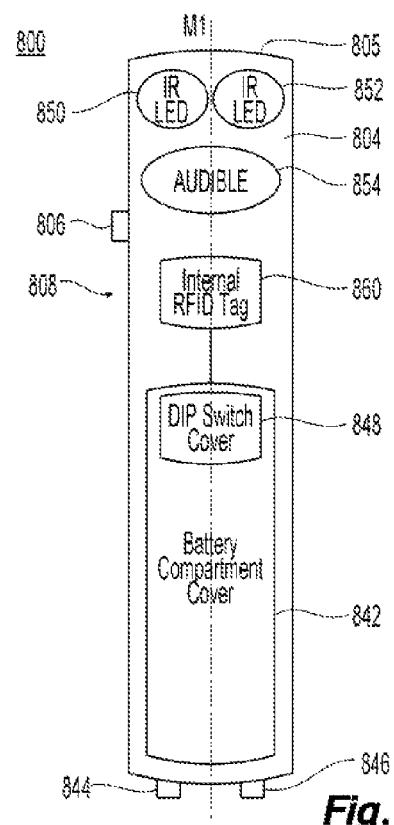
Fig. 8A
Fig. 8B

INFRARED COMMUNICATION POWER DRIVE UNIT AND METHOD FOR ACTIVATING SAME IN AN AIRCRAFT CARGO LOADING SYSTEM

RELATED APPLICATIONS

This application is related to U.S. patent application Ser. No. 11/939,216, filed on even date herewith, and entitled "Infrared Communication System For Activating Power Drive Units In An Aircraft Cargo Loading System", which contains substantially the same disclosure.

FIELD OF THE INVENTION

One embodiment of the present invention is directed to an air cargo system that utilizes power drive units equipped with infrared receivers. The power drive units are configured to receive and relay coded signals to a controller that controls the various power drive units in response to the coded signals.

BACKGROUND INFORMATION

Cargo within an airplane cargo deck is typically supported by a system of freely rotating floor-mounted conveyance rollers. Sets or banks of power drive units (PDUs) can be simultaneously elevated from beneath the cargo deck to a level just above the conveyance rollers. Spring-lift PDU's having surfaces which remain above the cargo deck may also be present in longitudinal areas of the cargo deck. Regardless of its type, each PDU may be a separate electro-mechanical actuator which includes one or more rubber coated wheels or drive rollers. The drive rollers of the elevated PDUs contact and move cargo above the conveyance rollers in the commanded direction upon energization. The movement of cargo depends on the coefficient of friction between the PDU drive rollers and the bottom surface of the cargo, as well as the lifting force generated by the PDU lift mechanism. When the PDUs are de-energized, roller rotation ceases and the cargo stops moving. Several sets of PDUs can be arranged along a common path of conveyance, and each set can be operated separately, thereby allowing for the transfer of multiple pieces of cargo. Loading personnel can guide cargo by means of a joystick, typically in combination with other switches, buttons and/or similar controls. Prior art PDUs, such as those disclosed in U.S. Pat. No. 5,661,384 and U.S. Pat. No. 7,014,038 are provided with an IR sensor to detect the presence of an ULD directly above a corresponding PDU.

FIG. 1 illustrates a layout of a cargo aircraft 100 having a cargo loading system 102 in accordance with the prior art. FIG. 2 presents an exemplary prior art wiring arrangement of the cargo loading system 102 connecting the principal elements of FIG. 1.

The aircraft 100 has a main cargo door 110 through which cargo containers and pallets (collectively known as unit load devices, or "ULDs") enter and exit the main cargo deck 152 within the main cargo compartment 113. Installed on the main cargo deck 112 are a plurality of PDUs 114a, 114b, such as those mentioned above, in the aircraft shown, most of the PDUs are arranged in rows 116, 118, on either side of a longitudinal centerline C of the cargo deck 112. As seen in FIG. 1, the PDUs 114a are arranged in the right row 116 while the PDUs 114b are arranged in the left row 118. ULDs in the form of cargo containers loaded into the cargo aircraft 100 typically are arranged in two rows, one on either side of the centerline C. It is understood that such cargo containers on a given side are propelled in the longitudinal direction by the PDUs located on that side. Additional PDUs may be found in an omni-directional area 120 proximate the main cargo door 110. It is understood that the main cargo deck 112 of a typical cargo aircraft will also be provided with various non-powered rollers, guides, restraints and the like, none of which are shown, for simplicity.

In a large aircraft, there may be several dozen PDUs 114a, 114b. To control the PDUs, the cargo loading system is provided, with a number of features. Among these are a controller, sometimes called a "main controller unit" (MCU) 130, a main control panel ("MCP") 132, and a plurality of local control panels ("LCPs"), including control panels 134a on right side 136 of centerline C as you lace the front of the aircraft 100, and control panels 134b on left side 138 of centerline C.

The MCU 130 comprises one or more processors physically connected to the PDUs 114a, 114b, the main control panel ("MCP") 132, and the plurality of local control panels ("LCPs") 134a, 134b. The connections between the various components may be made by one or more communication buses, each comprising one or more wires, cables, optical fibers or the like. As seen in FIG. 2, one possible bus configuration is that a first bus 140 connects the MCU 130 to the main control panel 132; a second bus 142a connects the MCU 130 to the right-side PDUs 114a and the right-side local control panels 134a; and a third bus 142b connects die MCU 130 to the left-side PDUs 114b and left-side local control panels 134b.

The MCU 130 receives commands entered via the main control panel 132 and the local control panels 134a, 134b. In response to such commands, the MCU 130 sends appropriate signals to selected PDUs 114a, 114b, ail in a manner known to those skilled in the art.

The MCP 132 is usually mounted next to the main cargo door 110. In one embodiment, the MCP 132 is mounted on a wall of the main cargo compartment 113, inside the aircraft. In some prior art aircraft, the MCP, or an auxiliary main control panel, may be accessible from outside the aircraft, at a point next to the main cargo door 110, allowing an operator outside the aircraft to control loading and unloading. In general, the MCP 132 includes indicator lights, a display comprising a screen and/or one or more rows of LEDs, and also such things as a joystick, buttons and/or switches to control the PDUs 114a, 114b.

The LCPs 134a, 134b are mounted on the inside wall of the cargo compartment 113, at spaced intervals along the length thereof. The LCPs 134a, 134b are similar to the MCP 132, but do not usually include a display; their primary function is to activate the rollers of a power drive unit to propel an ULD forward or backward, in a particular row 116 or 118. As is known to those skilled in the art, when an TCP 134a, 134b is activated, it sends a first signal to the MCU 130. The MCU, using information about the location of the ULDs, determines which PDUs 114a, 114b in the rows 116, 118 should be turned on, and sends a second signal to one or more of the PDUs 114a, 114b.

During loading operations, two or three person cargo loading/unloading teams are common. The primary operator runs the MCP 530 to move ULDs into and out of the main cargo door 110 from the off-aircraft loading platform. The assistant operators) utilize the LCPs 134a, 134b to control travel of cargo towards and away from the main cargo door 110 door, from within the longitudinal aircraft cargo compartment 113. If two assistant operators are present, each is commonly assigned a given side of the aircraft cargo compartment 113 to load. As is known to those familiar with air cargo operations, an ULD must be parked with sufficient precision so that it can be secured by cargo latches (not shown). This requires the assistant operators to be able to see the positions of each ULD well enough to be able to park it in a location which permits latching. And despite having numerous LCPs 114a, 114b, the fixed location of each on the wail of the cargo compartment 113 requires the assistant operators to stand atone of several discrete locations, providing them with less than ideal viewing of the required work area in which the ULDs are to be precisely placed.

SUMMARY OF THE INVENTION

In one aspect, the present invention is directed to a cargo loading system installed in a cargo compartment of an aircraft. The inventive cargo loading system comprises a plurality of power drive units (PDUs), each of the PDUs comprising a light detector coupled to a PDU processor and configured to receive and process an incoming light signal. The cargo loading system further comprises at least one main control panel (MCP) mounted on the aircraft, a controller connected by a wired network to the plurality of PDUs and also to the main control panel, and at least one wireless remote control handset configured to selectively emit a coded light signal. Each PDU processor is programmed to determine whether a coded light signal received at the light detector comprises a valid command signal from, the handset to be provided to the controller, and provide an appropriate first command information signal to the controller if the received coded light signal is determined to be a valid command signal from the handset. Furthermore, the controller is programmed to obtain, the first command, information signal provided by the PDU, determine which, if any, of said plurality of PDUs should be activated in response to the first command information signal, and send a first PDU control signal to activate only those PDUs that the controller has determined should be activated in response to the first command information signal.

In another aspect, the present invention is directed to a method of issuing commands from a controller of an air cargo loading system installed in an air cargo compartment of an aircraft to at least one power drive unit (PDU). The air cargo loading system includes a plurality of such PDUs connected via a wired network to the controller, each of the PDUs comprising a light detector coupled to a PDU processor and configured to receive and process an incoming light signal, each of the PDUs also being configured to detect whether a unit load device (ULD) is overhead. The method includes activating a first button on a first wireless remote control handset to thereby create a first light signal, and receiving the first light signal at a light detector of one of the PDUs. At that PDU, it is determined whether the received first light signal comprises a command signal to be relayed to the controller. If the received first light signal is determined to be a command signal to be relayed to the controller, an appropriate first command information signal is sent to the controller. At the controller, the first command information, signal is obtained, and a determination is made as to which of the PDUs should be activated in response to the first command information signal. The controller then sends a first PDU control signal via the wired network to activate only those PDUs that the controller has determined should be activated in response to the first command information signal.

In yet another aspect, the present invention is directed to a power drive unit (PDU) for an air cargo loading system, in which a controller is connected to a plurality of such PDUs via a wired network and is instructed via wireless remote handset to activate one or more of the PDUs in response to a coded light signal. The PDU comprises a light source configured to emit light, at least one light detector configured to receive light, and a PDU processor coupled to said at least one light detector. The PDU processor is programmed to determine whether a Unit Load Device (ULD) is overhead, based at least in part on reflected light received by said at least one light detector after illuminating an underside of the ULD by said light source, determine whether a coded light signal received by the at least one light detector comprises a command signal to be provided to the controller, and output an appropriate first command information signal if the coded light signal is determined to be a command signal.

BRIEF DESCRIPTION OF THE DRAWINGS

FIGS. 8A, 8B and 8C show the front, back and one side, respectively, of an exemplary wireless remote handset in accordance with one embodiment of the present invention;

DETAILED DESCRIPTION

The contents of aforementioned U.S. Pat. Nos. 5,661,384, and 7,014,038 are incorporated by reference to the extent necessary to understand the present invention.

Figure 6:
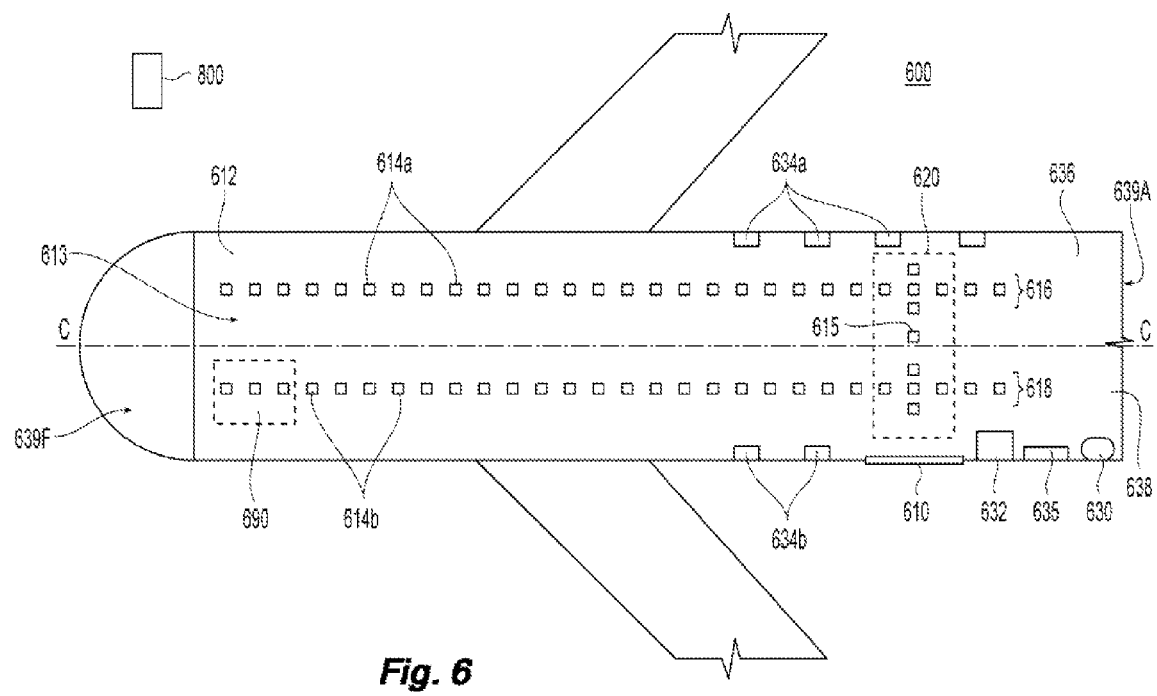
FIG. 6 illustrates a layout of a cargo aircraft in accordance with one embodiment of the present invention.
Figure 7:
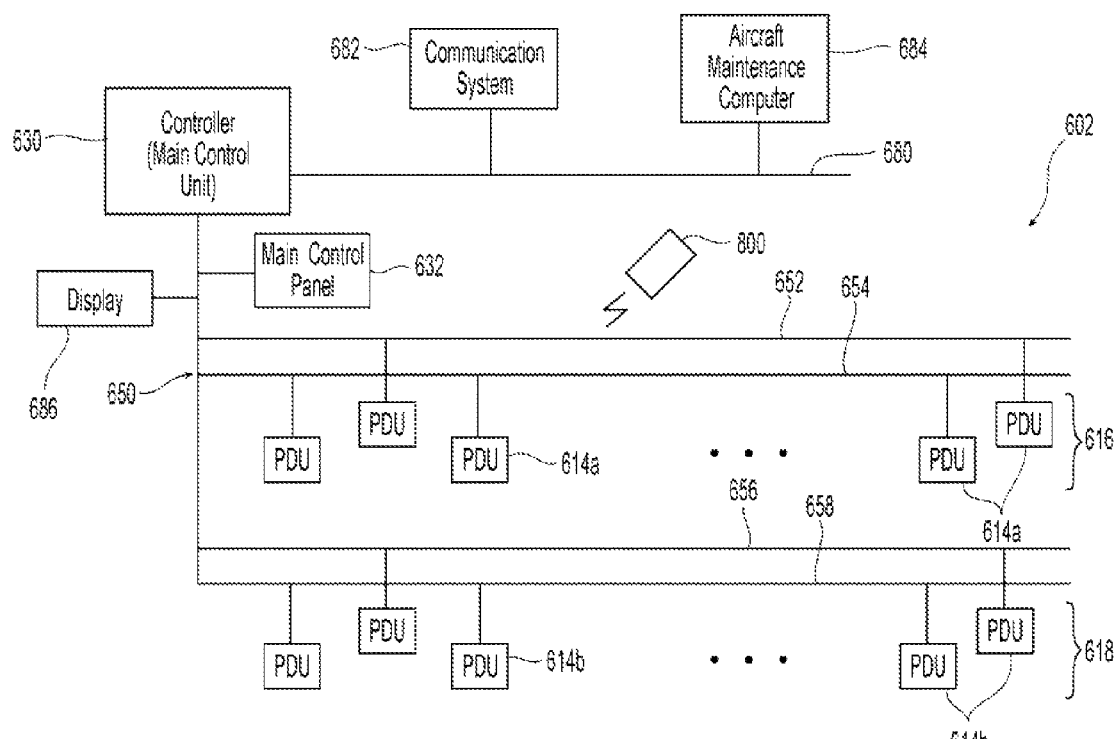
FIG. 7 shows a high-level wiring diagram for the layout of FIG. 6.

FIG. 6 illustrates a layout of an air cargo aircraft 600 having an air cargo loading system 602 (See FIG. 7) in accordance with one embodiment of the present invention. FIG. 7 presents a corresponding wiring arrangement connecting the principal elements of FIG. 6.

The cargo aircraft 600 has a main cargo door 610 which allows for passage of ULDs into and out of the air cargo compartment 613 for placement on the cargo deck 612. Installed on the right side 636 of a longitudinal centerline C of the cargo deck is the right row 616 of PDUs 614a, formed in accordance with the present invention. A left row 618 of PDUs 614b is installed on the opposite, left side 638 of the longitudinal centerline C. As seen in FIG. 6, an ULD 690 has been shown in phantom as covering three of the PDUs 614b. Additional PDUs 615, which may differ in design and/or operation from PDUs 614a, 614b, may be present in the omni-directional area 620, proximate the main cargo door 610. The cargo loading system 602 is provided with a main controller unit (MCU) 630 and a main control panel (MCP) 632 to control the various PDUs (see FIG. 7).

Figure 1:
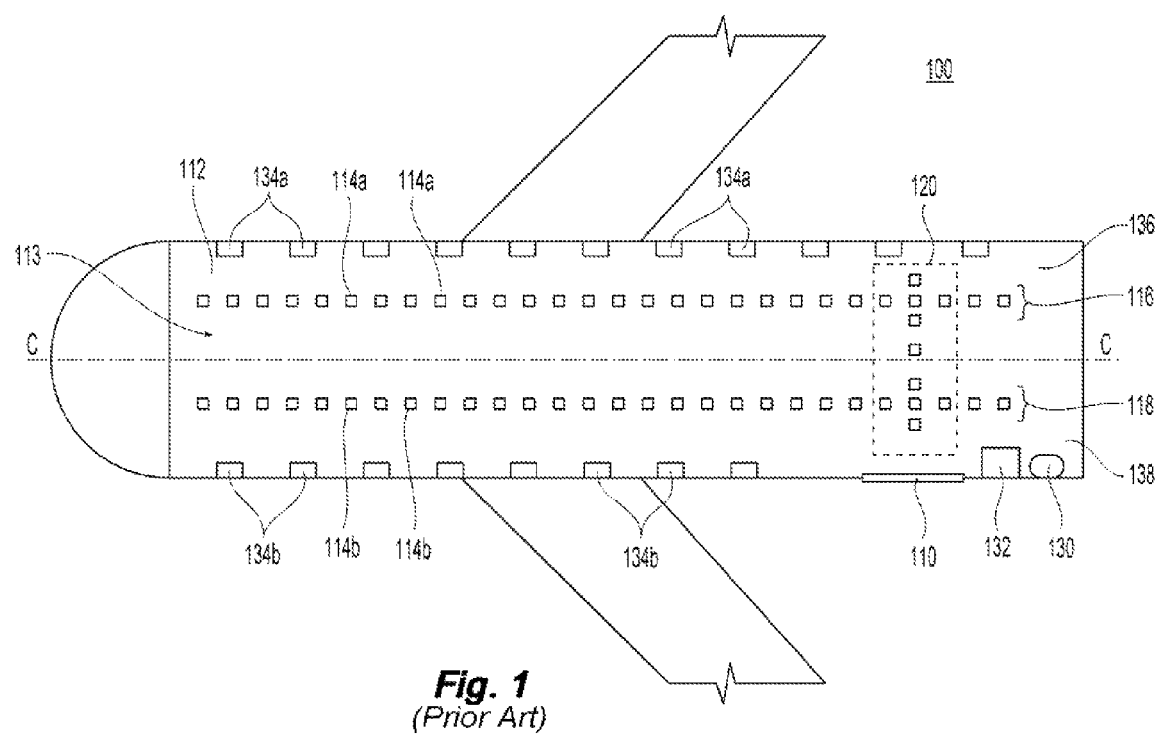
FIG. 1 illustrates a aircraft showing a typical layout of a main control unit, main control panel, local control panels and power drive units.
Figure 2:
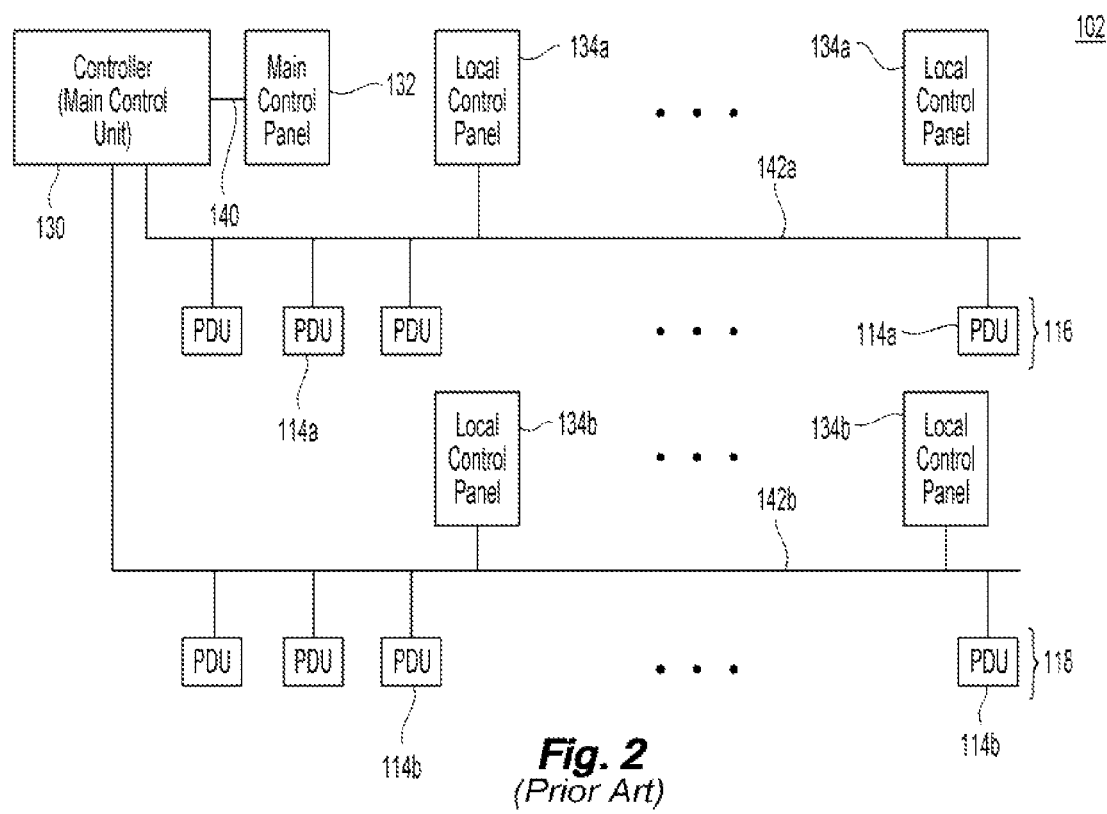
FIG. 2 shows a high-level wiring diagram for the prior art layout of FIG. 1.

Notably missing from the inventive cargo loading system 602 are the numerous local control panels (LCP) 134a, 134b found in the prior art cargo loading system 102 of FIG. 1 and FIG. 2. In one embodiment of the present invention, no LCPs are present in the cargo compartment 613. In other embodiments (as seen in FIG. 6), only a handful (e.g., less than five or six) LCPs 634a, 634b are deployed along the side wails of the cargo compartment 613. In the embodiment shown, a couple of conventional hardwired LCPs 634b may be used near the doorway for turning large pallets and a few additional LCPs 634a maybe found on the opposite side of the aircraft as well. Employing the hardwired LCPs in these locations allows use of relatively simple wireless remotes, though one may provision wireless remotes with the appropriate additional switches to handle such operations. In yet other embodiments, perhaps only one or two such LCPs need be present. If LCPs 634a, 634b are utilized, they could be attached to one or more of the communications buses 652, 654, 656, 658 (see FIG. 7). They may also be connected to one or more power buses. Connecting LCPs 634a, 634b to a plurality of communication buses and a plurality of power buses allows for more robust operation in the event of a LCP failure and/or a communication/power bus failure. For example, with respect to FIG. 7, if an LCP 634a on the right side was connected to communication bus 652 on the right side and also to communications bus 656 on the left side, then if the MCU 630 receiver for communication bus 652 failed, the LCP 634a could reroute data via communication bus 656.

The inventive cargo loading system 602 employs one or more wireless remote control handsets 800 to communicate with the MCU 630 via the PDUs 614a, 614b. In one embodiment, the handsets 800 emit infrared (IR) light signals. The handsets 800 travel with the aircraft 600 and reside in a docking station 635 near the main control panel. The handsets 800 generally are battery-powered and, in one embodiment, employ rechargeable batteries, such as a rechargeable battery pack, the handset being recharged while in the docking station 635. The wireless handsets 800 may be configured to also use off-the-shelf non-rechargeable batteries in the event that rechargeable batteries are not ready, or available, for use.

The remote control handsets 800 are provided with one or more buttons. The buttons on the handset may be raised, or may simply comprise marked regions on a flat handset panel which overlie switches below in a manner well known to those skilled in the art, or may even comprise regions of a touch screen. Upon activating any one of these buttons, such as by pressing a button, a handset 800 emits a first, coded IR light signal comprising a command signal. This first, coded IR light signal is received at a light detector of a first PDU within said plurality of PDUs 614a, 614b. At the PDU 614a or 614b, a determination is made as to whether the received first IR light signal comprises a valid command signal, i.e., a command signal to be relayed to the MCU 630. If so, an appropriate first command, information signal is sent to the MCU 630 via the wiring. At the MCU 630, the first command information signal is interpreted and then the MCU 630 determines what, if any, control signals should be sent to one or more of the PDUs 614a, 614b, in response to the first command information signal. After this determination has been made, the MCU 630 sends one or more control signals via the wired communications buses to affect only those PDUs that the MCU 630 has determined should be affected in response to the first command information signal.

As seen in the embodiment of FIG. 7, a wired (i.e., non-wireless) network 650 connects the various components of the inventive cargo loading system 602 to one another. The network 650 uses a communication interface, such as RS-232, CANbus (Controller Area Network), Ethernet, fiber optics, or the like. The network 650 comprises one or more communication buses. In the communications bus architecture shown, PDUs 614a, 614b are connected to the MCU 630 via buses 652, 654, 656, 658. PDUs not belonging to one row or the other, such as PDU 615 in the omni-directional area, may be arbitrarily assigned to one of these buses. The PDUs 614a in the right row 616 are connected to die MCU 630 via buses 652, 654 while the PDUs 614b in the left row 618 are connected to the MCU 630 via buses 656, 658. Each bus 652, 654 connects to every other PDU 614a of the right row 616 along the length of the cargo deck 612, while each bus 656, 658 connects to every other PDU 614b of the left row 618 along the length of the cargo deck 612. This ensures that if an entire bus malfunctions, only every alternate PDU in the corresponding row will lose communication with the MCU 630, thereby allowing the entire length of the cargo deck 612 in that row to still be used. Furthermore, an advantage of supporting the PDUs in a given row with multiple power buses, with every other PDU connected to the same power bus, is to reduce the maximum power that each power bus must be capable of supplying. PDUs in a such communication bused system know exactly where they are on the cargo deck 612. As is known to those skilled in the art, this may be realized by "pin programming", in which a unique jumper configuration is set on the bus connector that attaches to each PDU. The PDU reads the jumper configuration and thus knows where it is and, in typical embodiments, what commands it should respond to. It is understood that the MCU 630 may further be connected to other aircraft equipment, such as communication systems 682, aircraft maintenance computers 684 and the like, via a separate aircraft communications network 680.

FIG. 7 shows a bus structure for a control system devoid of LCPs and in which the PDUs 614a, 614b have only a single communication port. As LCPs 634a, 634b (see FIG. 6) are added and/or if the PDUs 614a, 614b are provided with a second communication port, they may be connected to a plurality of various buses as needed, without changing the underlying concepts of the present invention. Such as multi-bus interconnection via a common LCP, MCP, PDU can be advantageous to the handset 800 "Stop" implementation described further below.

Figure 8C:
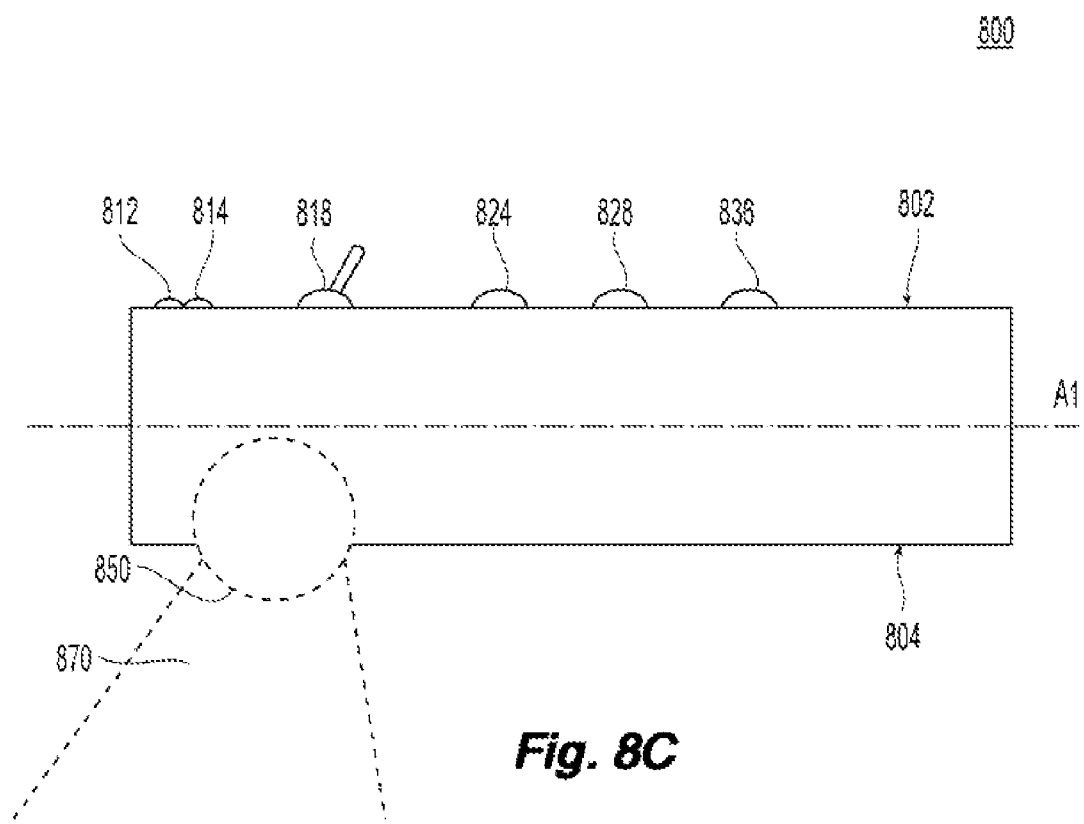

FIG. 8A shows the front 802 and FIG. 8B shows the back 804 of one embodiment of a wireless remote control handset 800 in accordance with the present invention. In one embodiment, the handset 800 is battery powered and uses coded IR light signals to communicate with the MCU 630. The front 802 of the handset 800 is provided with a number of light-emitting diodes (LEDs), buttons and switches which indicate operational status of the handset and control a portion of the air cargo loading system.

In one embodiment, the handset 800 includes an on/off switch 806 located on a first side 808 of the handset 800. In some embodiments, to save battery power, the handset 800 turns off by itself after a predetermined period of inactivity. In other embodiments, no on-off switch is provided. Instead, the processor within the handset 800 enters a "sleep" mode if one of its buttons hasn't been pushed for a preset amount of time, the processor waking up when one of the handset's buttons is pushed.

A cluster of three light-emitting diodes (LEDs) 812, 814, 816 provides status information. LED 812 indicates when the battery is low, and lights up only when a button is pushed, so as not to waste power when no operator can see the warning. LED 814 lights up to confirm signal transmission after one of the command buttons on handset 800 has been activated. LED 816 lights up to indicate that a command button has been pushed, but no signal transmission occurred. Such an error condition can happen when an invalid command button is pushed, e.g., the command was for a side of the cargo deck that the handset was not authorized to control.

The handset front 802 is also provided with a two-position "ULD Select" switch 818, which is configured to select which ULD to move, when more than one ULD is eligible to be moved, as discussed further below. If the ULD Select Switch 818 is in the "AFT" position 818A, the eligible ULD that is further aft in the cargo compartment 613 will be commanded by the MCU 630 to move. And if the ULD Select Switch 818 is in the "FWD" position 818B, the eligible ULD that is further forward in the cargo compartment 613 will be commanded to move.

The handset front 802 is further provided with a plurality of buttons 822, 824, 826, 828, 832, 834, 836, each of which may be backlit or otherwise illuminated to indicate that it is being activated. The backlighting feature may instead be used to help the operator read the switch legend in poor lighting conditions. An ambient light sensor may be used to gauge when the buttons should be backlit. The buttons may also be color coded to further allow quick recognition and differentiation of the buttons and their functions. Also, the surrounding background for a group of buttons may be color coded to indicate the functionality of that group of buttons. For instance, the handset background color behind all of the "Left" PDU drive buttons 824, 828 may be one color, while the handset background color behind all of the "Right" PDU drive buttons 822, 826 may be another color and the handset background color behind the "Both" buttons may 832, 834 be a third color. In addition to background color coding, background patterns, such as diagonal lines, crossed hatching, dots, and the like, may be used to further enhance functional button grouping and to aid users that may be visually impaired, e.g., color blind.

The handset 800 cart be pointed at any one PDU in either row 616, 618 to turn on the PDUs in either row. Thus, if an operator wanted to walk beside an ULD traveling along the right row 616, the operator could point the remote at any one of the PDUs 614b in the left row 618 to turn on the PDUs 614a under an ULD in the right row 616. However, even if a button is pushed and the handset 800 issues an IR command, no PDU(s) may be activated. This is because even though a PDU receives the IR signal from the handset 800 and relays that IR signal to the MCU 630, only the MCU 630 is authorized to determine if any commands to drive any of the PDUs will be issued. If, for example, intermixed contradictory commands are received, e.g., Right Fwd, Right Aft, Right Fwd, etc. (as might be received from a control panel (either the MCP or an LCP) and a remote, or from two remotes), the MCU 630 would stop driving the affected PDUs 814A, 814B until an unambiguous command is received. In one embodiment, an exception to having all commands interpreted only by the MCU 630 is the "Stop" command, described further below.

For safety reasons, a given handset 800 can be set so that it is locked out from driving PDUs on a given side. Thus, operator "A" may be given a first handset that can only drive PDUs 614a in the right row 616, while operator "B" may be given a second handset that can only drive PDUs 614b in the left row 618. The exterior surface of the handsets may be provided with indicia, such as a color coding, to indicate such things as their row-specificity.

Thus, when color coding is used, a first color may be used to indicate a right side 636 (PDU row 616) handset, a second color may be used to indicate a left side 638 (PDU row 618) handset, a third color may be used to indicate a 'both sides' handset (PDU rows 616 & 618), and a fourth color may be used to indicate a handset that is settable via a DIP (Dual Inline Package) switch that is accessible by removing a DIP Switch Cover 848 on the back of handset 800. Thus, the color coding of a given, handset can be used to identify the capability of that handset.

When the handset 800 is aimed at a PDU in either row 616, 618 and button 822 is activated, one or more PDUs 614a on the right side 636 of the centerline C (right row 616) are turned on or "activated", if the MCU 630 accepts the command from the remote as being appropriate and issues commands to the PDUs in response thereto. This causes the PDUs 614a to propel an overlying ULD in the forward direction (i.e., towards the forward end 639F of the cargo compartment 613). Likewise, activating button 826 causes the PDUs 614a in the right row 616 to become activated and propel an ULD in the aft direction (i.e., toward the aft end 639A of the cargo compartment 613). Similarly, activating buttons 824, 828 causes the PDUs 614b on the left side 638 of the centerline C to turn on in the forward or aft direction, respectively. It is understood that activating any one of buttons 822, 824, 826, 828 causes PDUs only in one row to become activated, and none of the PDUs in the other row becoming activated. It is further understood that a second handset may be used at the same time to activate the PDUs in a row whose PDUs are not already in motion. In addition, separate buttons are provided on a handset 800 to activate the PDUs 614a, 614b in both rows to move in the same direction and at the same time. Specifically, button 832 causes the PDUs 614a, 614b in both rows 616, 618 to turn on so as to propel, an ULD in the aft direction, while button 834 causes the PDUs 614a, 614b in both rows 616, 618 to turn on so as to propel an ULD in the forward direction.

In one embodiment, the handset 800 is configured such that buttons 822, 824, 826, 828, 832, 834 emit a coded IR light signal so long as they are activated. This coded IR light signal, if found to be a valid command signal, is then relayed by the receiving PDU 614a, 614b to the MCU 630 in the form of a coded information signal. Once a button is released, the coded IR light signal is no longer sent by the handset 800 and the coded information signal is no longer provided to the MCU 630 by the PDUs 614a, 614b. The MCU 630 is configured such that PDUs are activated, only so long as the MCU 630 receives this properly coded and relayed information signal. Since the PDUs are turned on only while a button remains activated, each button 822, 824, 826, 828, 832, 834 effectively acts as a "dead man switch"—once a button is released, the corresponding PDUs cease to operate.

The handset 800 is also provided with a system stop button 836. When activated, the system stop button 836 causes the MCU 630 to "deactivate" all PDUs in the cargo loading system 602 so that the PDUs quit driving their motors. In one embodiment, once a stop button 836 has been activated, all other buttons on any handset and also on the MCP 632 are ignored by the MCU 630 until the system stop status has been reset at the MCP 632. And when a reset is performed at the MCP 632, an audible and/or visual alert may be provided to warn personnel that the system is being reset to continue operations. The audible and/or visual alert of system reset could come from devices mounted in any of the cargo system units, e.g., the control panels and/or the PDUs.

The back side 804 of handset 800 is provided with a battery compartment beneath a battery compartment cover 842. In those handset embodiments in which the batteries are rechargeable, two metal contacts 844, 846 are provided at a bottom end of the handset 800 for mating with complementary contacts (not shown) in the docking station 635. In such case, the docking station 635 not only serves as a place to store the handset, but also recharges the handset 800. In another embodiment the docking station 635 may be configured to charge handset 800 via inductive coupling. In this latter instance, the handset 800 has a coil of wire that acts as the secondary winding of a transformer associated with the docking station 635. The inductive coupling method requires no electrical contacts for charging which may otherwise suffer from wear, corrosion, dirt and other issues.

The handset 800 is also provided with a Dual inline Package (DIP) switch, hidden by the DIP switch, cover 848 positioned on the handset back 804. In some embodiments, the battery compartment cover 842 and the DIP switch cover 848 may be one and the same. The DIP switch is used to set any information that is variable and settable on the handset 800. Settable parameters may include which side of the cargo bay the handset 800 controls, or a channel, code, or other information about the signals emitted from a given handset 800. Thus, the DIP switch's setting can determine one or more properties of the coded light signals sent by the handset and these properties may even include which of the PDUs 614a, 614b the handset can be used to operate. The DIP switch settings may be transmitted when a button on the handset is pushed to send a coded light signal. In some embodiments, the PDUs 614a, 614b may be provided with corresponding DIP switches which may be set to match those in a handset 800.

The handset 800 may optionally be provided with an internal RFID tag 860, whose tag number may be controlled in part by the DIP switch 848. The RFID tag 860 may be provided to help with handset location and/or identification, when it has been misplaced or stolen. In one embodiment, the RFID tag 860 may be configured to cause an alarm to sound, if the handset is taken through the aircraft cargo door. For this, one or more RFID tag readers connected to the MCU 630 may be placed near the doorway, and upon detection of the tagged handset 800 may send a signal to the MCU 630 resulting in an audible and/or visible alarm. In addition, the RFID tag may be used to assist in registering the handset 800 at the main control panel. For this, the MCP 632 has an associated RFID tag reader/writer which is used to register the handset 800 and send appropriate registration information to the MCU 630. At the same time, the handset 800 may be programmed to work on one or both sides of a cargo compartment, or provisioned with other capabilities. In addition, the MCU 630 is henceforth able to verify that an IR command signal comes from a registered handset.

In one embodiment, the handset back 804 is provided with a pair of light emitting diodes (LED) 850, 852 which are configured to emit one or more light beams that are broad enough to reach a PDU at which the handset is aimed and/or to provide redundancy in the event that one of the LEDs fails. In the embodiment seen in FIGS. 8A, 8B and 8C, two signaling LEDs 850, 852 are located on the handset back 804, proximate the top wall 805. The LEDs 850, 852 form a combined light beam 870 that is directed in a generally downward direction away from the handset front 802 and slightly in the forward direction. One LED 850 is configured to emit a first light beam directed slightly outward on one side from a medial plane M1 that extends through the longitudinal center axis A1 of the handset 800 and perpendicular to the front 802 and rear 804. The second LED 852 is configured to emit a second light beam directed slightly outward on the other side from the medial plane M1. The combined light beam 870 (FIG. 8c) ensures that an IR signal reaches a targeted PDU, in spite of small obstructions or poor operator aim. The light signals from these two LEDs may be transmitted simultaneously or alternately. These LEDs can be monitored to see that they turn on when activated. If a given LED fails, the alternate LED can be activated if not already being utilized. In addition, the failed status of the LED can be included in the transmitted light signal to the aircraft MCU 630 and/or display 686 in order to inform maintenance personnel of the issue. This monitoring and reporting function can be included for any of the devices in the handset, e.g., the LEDs, the audible device, the battery charge level, etc. The MCU 630 can then display the information on the cargo system display 686 and/or forward the maintenance information to the Aircraft Maintenance Computer 684 and/or off aircraft maintenance systems.

In addition, the handset 800 may be provided with an audible device, such as a piezo device 854, which in the embodiment shown, is located in the handset 800. The audible device 854 may be configured to provide audible confirmation of button pushes, error conditions, low battery, and the like. Different tones or sound patterns may be provided for each of these.

Figure 3A:
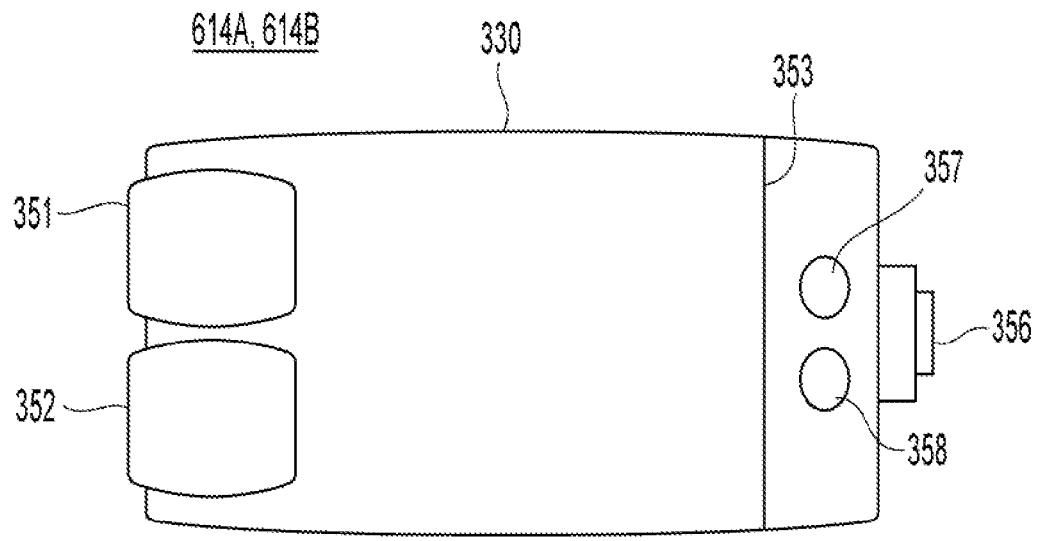
FIG. 3A is a top view of a PDU in accordance with one embodiment of the present invention in which the PDU has a single light sensor.

FIG. 3A is a top view of a PDU 614a, 614b in accordance with one embodiment of the present invention. PDU 614a, 614b includes a housing 330 which incorporates a pair of wheels 351, and 352 that function, as drive roller elements. Wheels 351 and 352 are coupled to a drive shaft (not shown), PDU 614a, 614b further includes necessary motor and gear assemblies (not shown) for turning and/or raising wheels 351 and 352 so that wheels 351 and 352 are positioned above the cargo deck and are able to contact the bottom of a ULD.

PDU 614a, 614b further includes an electronics cavity that is separated from the rest of the PDU by a wall 353 for housing the necessary electronics (disclosed in more detail below), and includes an electrical connector 356 for coupling the electronics to a communications bus 652, 654, 656, 658 and also to a power bus (not shown), PDU 614a, 614b further includes a Sight source 357, such as an IR transmitter having a LED, for emitting infrared light. PDU 614a, 614b further includes a light detector 358, such at) IR receiver having a photo transistor, for detecting the presence of infrared light. In other embodiments, other types of light besides IR can be used. It is understood by those having ordinary skill in the art that when the light source 357 emits light of a particular wavelength (e.g., infrared), the light detector 358 will react to light that is reflected in the latter's direction. This is based on the light detector's 358 response characteristics in the relevant wavelength, and may be enhanced by appropriate optical filters, lenses and the like.

Figure 4A:
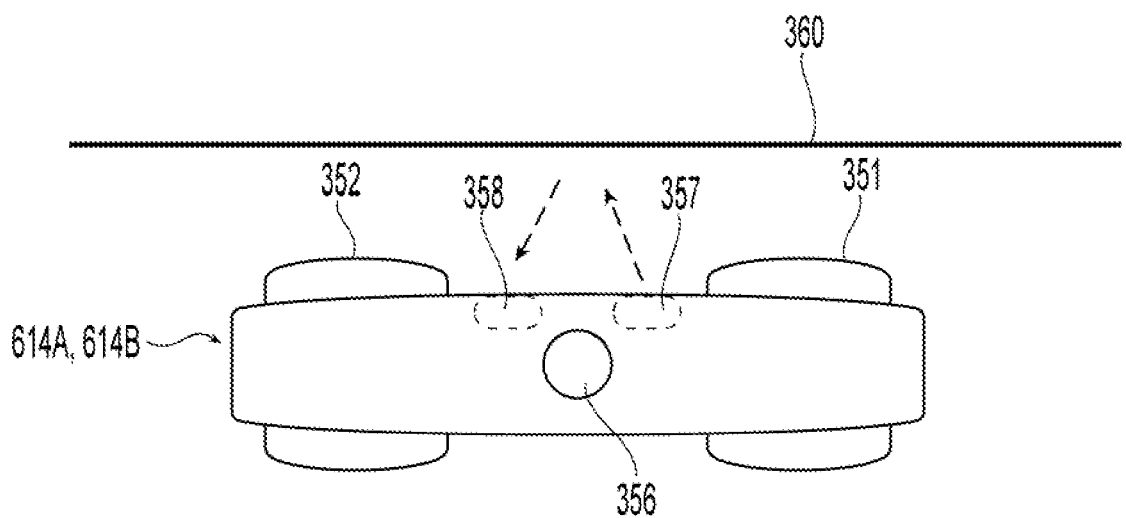
FIG. 4A is an end view of the PDU seen in FIG. 3A.

FIG. 4A is an end view of PDU 614a, 614b in accordance with one embodiment of the present invention, and illustrates the relationship of PDU 614a, 614b with the bottom surface 360 of a ULD that is passing over and being propelled by the PDU 614a, 614b. The light source 357 emits light that bounces off the bottom surface 360 (assuming a ULD is present) and is reflected back to light detector 358 where it is processed by the electronics of PDU 614a, 614b.

Figure 5A:
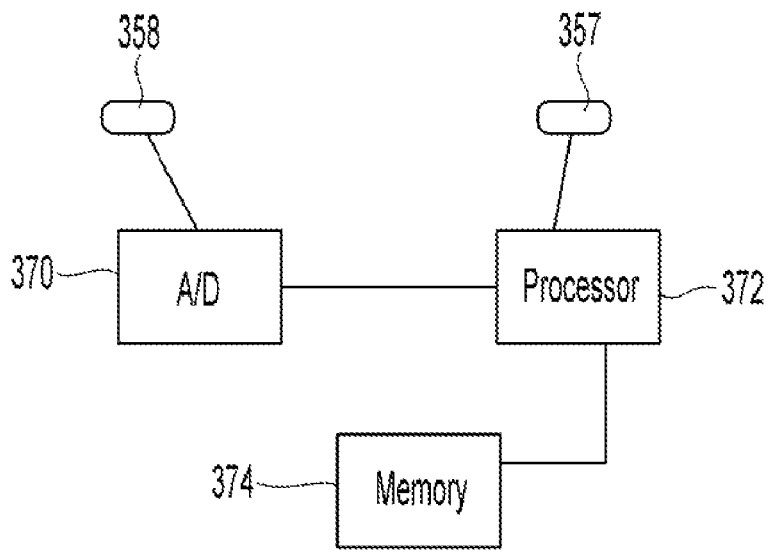
FIG. 5A is a block diagram of the electronics of the PDU seen in FIG. 3A.

FIG. 5A is a block diagram of the sensor electronics of the PDU 614a, 614b in accordance with one embodiment of the present invention. Coupled to light detector 358 is an analog to digital ("A/D") converter 370 that takes an analog input voltage from the light detector 358 and converts it to a digital value representative of an instantaneous intensity of light. Coupled to A/D converter 370 is a processor 372 and memory 374. Processor 372 may be any type of general purpose processor, and memory 374 may be any type of storage device that stores instructions to be executed by processor 372. In one embodiment, processor 372 may include A/D converter 370 and/or memory 374. Light source 357 is coupled to an output pin of processor 372. In one embodiment, a power driver may be needed between processor 372 and the light source 357.

A processor-adjustable variable resistor may be coupled to processor 372 and light detector 358. The variable resistor is used to set the sensitivity of A/D converter 370, which selects the window of light that the sensor will measure (i.e., the minimum strength of light that will be detected and the greatest strength of light that can be measured before the A/D converter's output reaches its maximum value). In one embodiment, the A/D converter 370 is a 10-bit A/D converter, although A/D converters of other bit resolutions may be used instead. In one embodiment, the A/D 370 samples the time-varying light intensity at a rate of 200 samples/second, or at 5 msec intervals. Thus, for a one-second pulse, a time series of 200 digital samples are taken, and these are provided to the processor 372 for further calculations. It is understood that other sampling rates may be used, depending on the A/D 370 and processor 372 speed.

The processor 372 and the transmitter 357 are configured such that transmitter 357 emits a first coded light signal (a "ULD detection signal") to test for the presence of an ULD overhead. If the light transmitter 357 emits the ULD detection signal and the light detector 358 receives nothing, the PDU 614a, 614b assumes that no ULD is overhead. If, on the other hand, the light transmitter 357 emits the ULD detection signal and the light detector 358 receives a reflected version of that signal, the PDU 614a, 614b assumes that an ULD is overhead.

In addition to being able to recognize the ULD detection signal, the PDU 614a, 654b is also configured to receive coded IR light signals emitted by the wireless remote handset 800, determine whether they constitute one or more valid command signals, and if so, output a corresponding coded command information signal to the MCU 630.

Operation of the PDUs 614a, 614b by the main control panel 632 and the handset 800 is now explained.

Figure 9:
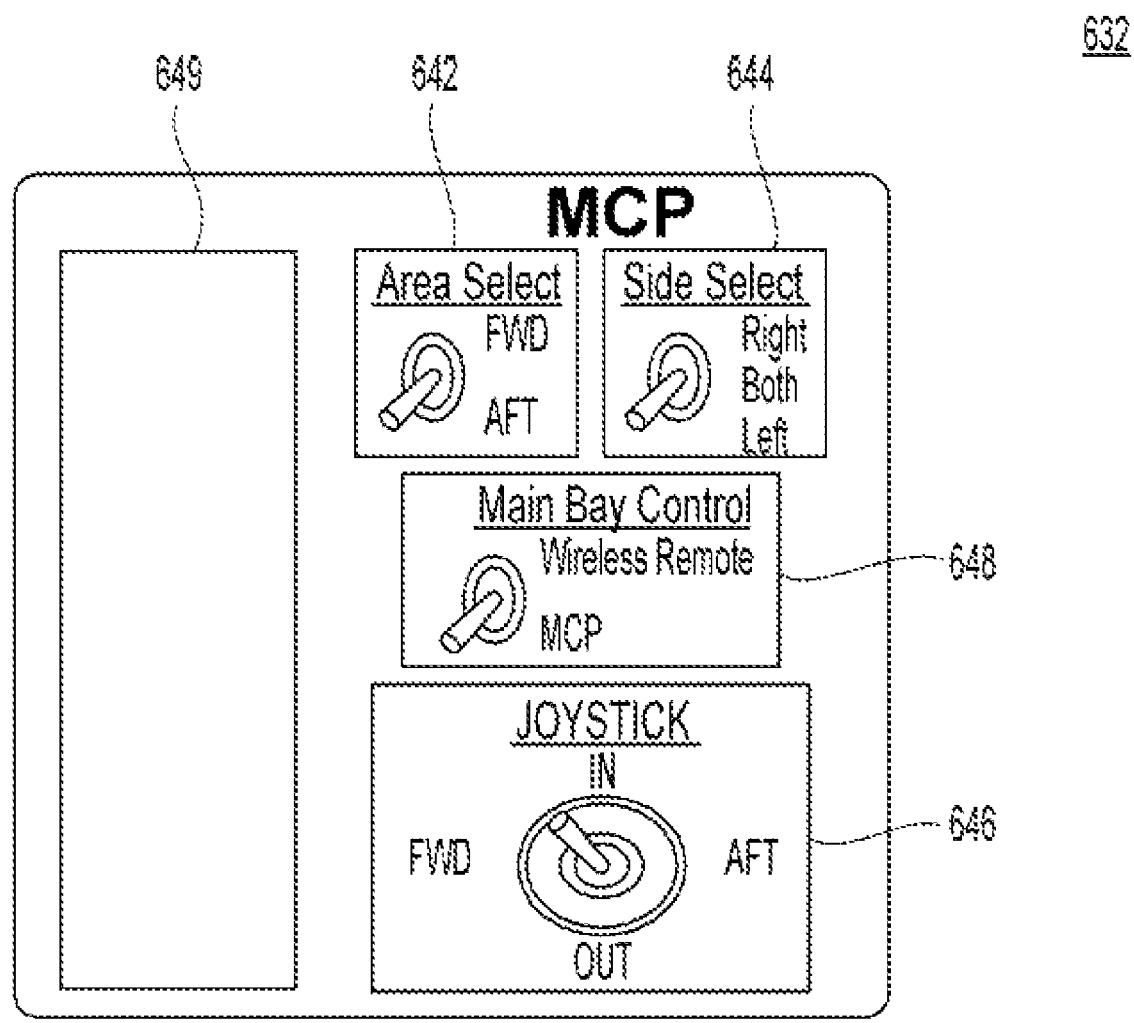
FIG. 9 shows a main control panel (MCP) in accordance with one embodiment of the present invention.
Figure 10:
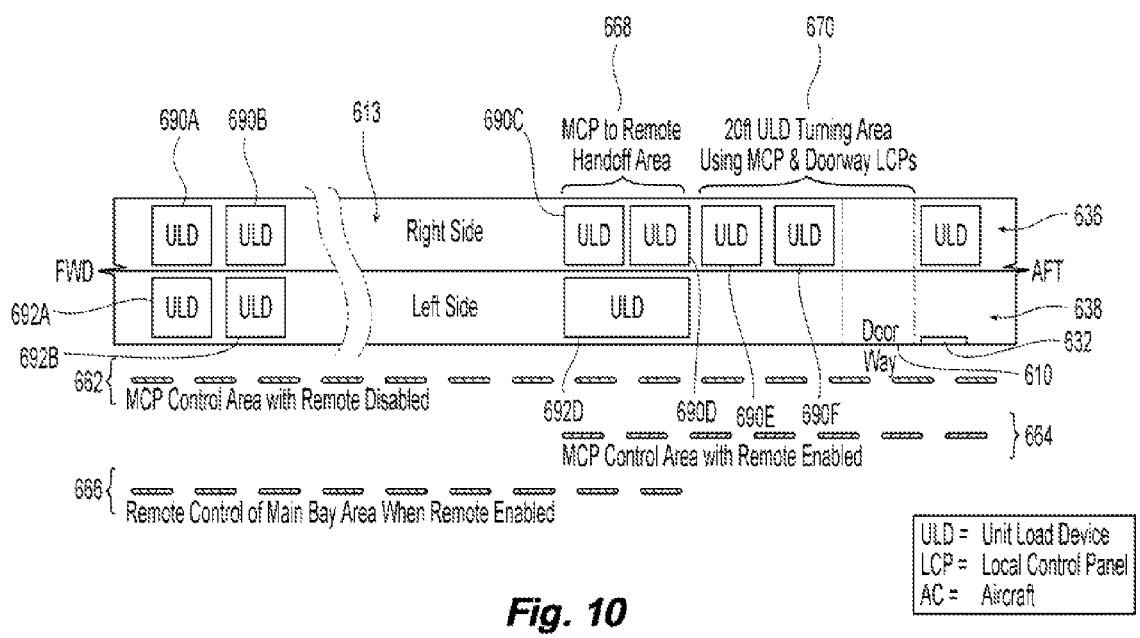
FIG. 10 illustrates the zones controlled by the MCP and the handset.

FIG. 9 shows salient portions of one embodiment of a Main Control Panel 632 that may be used in conjunction with the present invention, and FIG. 10 illustrates how the MCP 632 and the handset 800 can be used together.

As seen in FIG. 9, an MCP 632 in accordance with the present invention may include an area select switch 642, a side select switch 644, a joystick 646 and a "Main Bay Control" mode switch 648. The MCP 632 may also have other buttons, switches, displays and the like, which are not required to understand the present invention and are shown generally as 649.

The area select switch 642 allows the operator of the MCP 632 to select whether the PDUs to be driven are those in the doorway and forward of the doorway, or in the doorway and aft of the doorway. In the air cargo deck depicted in these figures, the vast majority of the PDUs are located forward of the doorway, and so most often it is the PDUs 614a, 614b forward of the doorway that are to be controlled. The side select switch 644, which typically has at least three positions, is used to determine which PDUs are to be driven at any given instant—those on the "RIGHT" side 636 (PDU row 616), those on the "LEFT" side 638 (PDU row 618), or those on "BOTH" sides 636, 638. The spring-loaded joystick 646 can be used to move an ULD that is in the doorway area, either into or out of the cargo compartment 613, and may be used to move one or more ULDs within, the cargo compartment 613 either in a forward or an aft direction. The position status of the area select switch 642, the side select switch 644, and the joystick 646 on the MCP 632 are sent to the MCU 630, which then determines what actions to take and what commands to issue for further operation and control.

The "Main Bay Control" mode switch 648 has at least two positions. The status of the "Main Bay Control" mode switch 648 is utilized by the MCU 630 to selectively permit inputs from either just the MCP 632 to cause the PDUs 614a, 614b to operate, or from both the MCP 632 and the handset 800 to cause the PDUs 614a, 614b to operate. In a first position, only the MCP 632 and LCPs near the doorway (if present) are permitted to cause the PDUs 614a, 614b to operate, and activating the buttons on the handset 800 has no effect. Thus, when the MCP's 632 "Main Bay Control" mode switch 648 in is the first position, the handset 800 is effectively disabled and is precluded from controlling the PDUs because the MCU 630, knowing the status of the MCP's 632 Main Bay Control switch 648, will not act on the commands sent by handset 800 and received by the MCU 630. In a second position, both the MCP 632, LCPs (if present) and the handset 800 may be used to control the PDUs 614a, 614b. Thus, when the "Main Bay Control" mode switch 648 in is the second, position, the handset 800 is enabled and so it may control the PDUs 614a, 614b, in addition to the MCP 632 and any LCPs (if present).

One exception to the handset 800 being effectively disabled when the MCP's 632 "Main Bay Control" switch 648 is set to the first position is the "Stop" button 836 on the handset 800. Pushing the handset's 800 "Stop" button 836 will cause the handset 800 to transmit a coded light signal comprising a valid stop command. In one embodiment, the valid stop command, after being received by a PDU or an LCP equipped to process coded light signals, is passed on to the MCU 630 in the form of a command information signal, and the MCU 630, in response, transmits a PDU stop command to all the PDUs, before any PDU is deactivated. However, in a second embodiment, the PDUs become deactivated directly in response to a valid stop command without involvement by the MCU 630. In this second embodiment, when a valid stop command is received, by a first device (e.g., a PDU or an LCP equipped to process IR command signals) from a handset, that first device broadcasts a direct stop command to all devices on all communications buses to which it is connected. In this manner, other devices connected to any communications bus to which the first device is connected, also receive the direct stop command and react accordingly. Thus, a device such as a PDU receiving the direct stop command from the first device in this manner will react by becoming deactivated. In addition, the devices may be configured such that any device receiving the direct stop command on one communications bits will retransmit the direct stop command on one or more buses other than, the bus on which said direct stop command was received. This "ripple" process allows a valid IR stop command from a handset 800 to propagate throughout the cargo loading system to some extent even if a communications bus has been cut or if the MCU 630 (or some other device) has ceased to operate.

FIG. 10 illustrates one embodiment of how the areas controlled by the MCP 632 and the handset 800 may vary, depending on the setting of the "Main Bay Control" mode switch 648. As seen in FIG. 10, ULDs designated 690A, 690B, 690C, 690D, 690E, 690F are positioned forward of the doorway 610 on the right side 636 of the cargo compartment 613, while ULDs designated 692A, 692B, 692D are positioned forward of the doorway 610 on the left side 638 of the cargo compartment 613. When the mode switch 648 is in the first position and the handset 800 disabled, (i.e., in a first mode), operation of the MCP 632 causes the MCU 630 to activate one or more of the PDUs and thus propel, one or more of the ULDs in a first zone 662 extending the full length of the cargo compartment 613. When the mode switch 648 is in the second position with the handset 800 enabled (i.e., in a second mode), operation of the MCP 632 again causes the MCU 630 to activate one or more of the PDUs in a second zone 664 that is a subset of the first zone 662. This second zone 664 occupies the aft portion of the cargo compartment 613, and includes a turning area 670 having a length sufficient in which to turn lengthy (e.g., 20 foot-long) ULDs as they enter or exit the doorway. Also, when the mode switch 648 is in the second position, the handset 800 causes the MCU 630 to activate one or more of the PDUs in a third zone 666 that is a subset of the first zone 662. This third zone 666 occupies the forward portion of the cargo compartment 613. As seen in FIG. 10, the second zone 664 and the third zone 666 overlap in a handoff area 668. In the handoff area 668, both the MCP 632 and the handset 800 can control the PDUs.

During a typical loading/unloading operation with the remote handset 800 enabled, the MCP 632 and any LCPs move the ULDs into and out of the doorway and adjacent areas, i.e., within the second zone 664, while the handset 800 moves ULDs into and out of the main bay area in the forward portion of the cargo compartment 613, i.e., within the third zone 666. The handoff area 668 formed by the overlap of the second zone 664 and the third zone 666 is used to temporarily store the ULDs to accommodate an efficient asynchronous operation. In such an asynchronous operation, an ULD brought into the handoff area 668 due to signals from either the MCP 632 or the handset 800 need not immediately be further moved.

Any possible conflict between the MCP 632 and the handset 800 over control of the handoff zone 668 would be automatically arbitrated by the MCU 630 on a first-come, first-served basis or by some alternate arbitration algorithm, e.g., the MCP 632 has priority, or the handset 800 has priority, etc., as established by software resident in the MCU 630. Simultaneous operation of two different ULDs in the handoff area 668 is possible. For instance, the MCP 632 could be used to move a first ULD into the aft side of the handoff area 668, while the handset 800 may be used to pull a second ULD out of the forward side of the handoff area 688 to move that second ULD to its final position further forward within the cargo compartment 613.

For safety reasons, any time that the MCP's "Main Bay Control" mode switch 648 changes position to transition between the first and second modes of operation, audible and/or visible alerts may be emitted for a period of time to forewarn operators and others in the cargo compartment 613 of the impending control transfer. The audible and/or visual alerts of transitioning between the first and second modes of operation could come from separately mounted devices or from devices mounted in any of the cargo system units, e.g., the control panels and/or the PDUs. The audible warning may be a klaxon, a solid state "buzzer", or the like. The visual warning may be a flashing light. In one embodiment, the LEDs in the MCP 632 and LCPs 634a, 634b that are normally used for other purposes may, during a transitional wanting period, all be made to flash.

When the "STOP" button on the handset 800 is activated, all cargo movement in the entire compartment 613 will stop until the system stop is reset by an operator at the MCP 632. This allows the handset 800 to enhance the efficient movement of cargo, and also serve as a personal safety stop device anywhere in the cargo compartment 613, instead of only at discrete locations, such as near the doorway 610, where an MCP 632 or doorway LCPs 634a, 634b may be mounted. This system stop condition could also be communicated to the operators by an audible and visual indication. The audible and visual indication for the two transition types (Control Change and System Stop) could be differentiated by unique sound and/or light patterns.

Figure 11A:
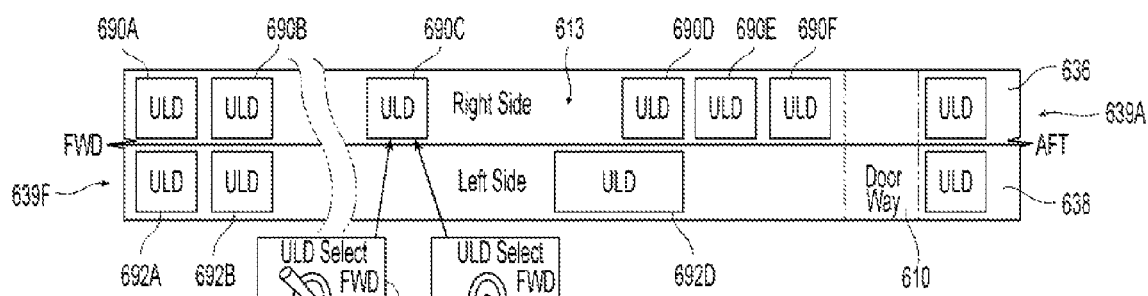
FIGS. 11A and 11B illustrate the selection of which ULD to move, when more than one is eligible to be moved within the cargo compartment.
Figure 11B:
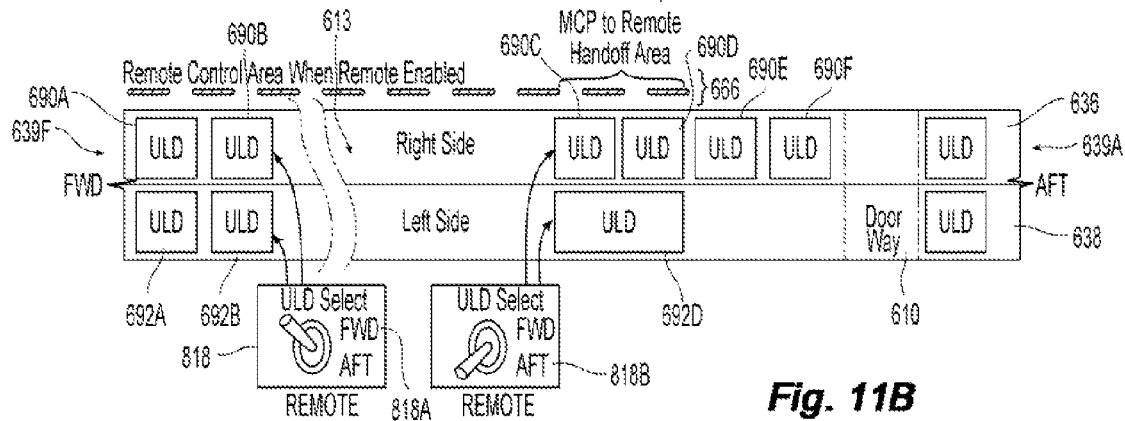

FIGS. 11A and 11B help explain which ULD is to be moved, when the wireless remote is activated.

As stated above, commands from the handset 800 are only accepted by the MCU 630 if the Main Bay Control Switch 648 on the MCP 632 is set appropriately (unless it is the handset 800 "STOP" button 836 that is activated, as explained above). Also, as stated above, when the handset 800 is allowed control, it only has control in its control zone 666. Generally speaking, when a drive forward/aft button 822, 824, 826, 828 is pushed on the handset 800, the 'selected' ULD (in the handset's control zone 666) will move in the corresponding direction. However, which ULD is selected for movement will depend on a two-level hierarchy. An isolated ULD (e.g., ULD 690C in FIG. 11A) has priority and is automatically selected by the MCU 630, regardless of the setting of the "ULD Select" switch 818 on the handset 800. For these purposes, an isolated UDL is defined as one having gaps on both sides of it. The presence of such gaps may be established by having uncovered PDUs on both sides of the ULD so that the PDU's ULD sensors detect the absence of an ULD overhead.

If there aren't any isolated ULDs (see FIG. 11B), then the FWD/AFT setting of the "ULD Select" switch 818 on the handset 800 will determine which ULD is to be moved. When the "ULD Select" switch 818 is set to the FWD position 818A, the MCU 630 understands that it is to activate the correct PDUs so as to propel the forwardmost ULD on the correct side of the compartment 613, which is eligible to move in the specified direction. And when the "ULD Select" switch 818 is set to the AFT position 818B, the MCU 630 will propel the aftmost ULD in the handset's control zone 666 instead. For instance, as seen in FIG. 11B, on the left side 638 of the cargo compartment 613, ULDs 692B and 692D are both eligible to be moved by the handset 800, since both are in the third zone 666, and since they have open space next to them. If the "ULD Select" switch 818 is set to the FWD position 818A, and the "Left Aft" button 828 is pushed on the handset 800, the forwardmost ULD 692B moves in the aft direction, while ULD 692D remains stationary. If, instead, the "ULD Select" switch 818 is set to the AFT position 818B, and the "Left Aft" button 828 on the handset 800 is pushed, ULD 692D would not move AFT even though if was selected since the PDUs at the end of the handset's control zone 666 are already covered. The other ULD 692B with open space adjacent to it would not move since it was not selected by the handset's "ULD Select" switch 818.

The above-described operation thus explains which ULD is moved by the MCU 630, when a plurality of PDUs are covered by two or more ULDs and more than one ULD is eligible to be moved in response to a valid command signal from the handset 800. MCU 630 is configured (e.g., programmed) to give first highest priority to activating one or more PDUs so to move an ULD that has uncovered PDUs at both its forward and aft ends, i.e., an ULD that is "isolated". Thus, when an ULD is "isolated", the MCU automatically selects the isolated ULD and ignores the status of the handset's "ULD Select" switch 818. The MCU 630 is further configured to assign second highest priority to activating one or more PDUs so to move an ULD that has an uncovered PDU at one of its ends (either forward or aft) and on the other end has PDUs covered all the way to the end of the control zone. The PDUs between the open end and the end of the control zone may be covered by a single ULD or multiple ULDs. The MCU will activate the fewest number of covered PDUs adjacent to the uncovered PDUs end. The fewest number of PDUs are activated so that only a single ULD is pulled from the stack of ULDs. This fewest number of PDUs to be activated is ascertained by having the ULD size and location calculated and recorded as the ULDs are loaded into the compartment, or by using the number of PDUs for the smallest ULD allowed on the aircraft. The calculated and recorded number of PDUs would normally take priority. If the system determined that the calculated and recorded data was unreliable (via memory checksum test, etc), then the number of PDUs covered by the smallest container would be utilized. Regardless of how the fewest number of PDUs to initially energize was decided, once this number of PDUs was energized, a timer would start. If, after a given number of seconds has passed and no new PDU was uncovered, an additional covered PDU would be turned on and the timer would, be reinitialized and restarted. Either way, the number of PDUs to be activated depends on an assumed size of the ULD to be moved and if after a predetermined time period, the activated number of PDUs is insufficient to move said selected ULD, at least one additional PDU is activated. This process is continued until either (a) a new PDU was uncovered indicating that enough PDUs had been turned on to move a single ULD, or (b) until all PDUs to the end of the control area had been turned on and had timed out, thus indicating that the ULD(s) were jammed and that the PDUs were slipping/scrubbing.

An exemplary sequence of operations, and their consequences, using the handset 800 in conjunction with the initial ULD positions of FIG. 11B is now described. (1) The "ULD Select" switch 818 is set to the aft position 818B; (2) on the handset, the "Right Fwd" button 822 is pushed; (3) this causes ULD 690C in the handoff area 668 to move in the forward direction towards previously parked ULD 690B; (4) the operator can stop the ULD 690C at any time by releasing the "Right Fwd" button 822; (5) if the operator releases the "Right Fwd" button 822, the ULD 690C becomes isolated, as seen in FIG. 11A; (6) If the operator again pushes the "Right Fwd" button 822, the isolated ULD 690C will again move towards the forward end 639F of the cargo compartment 613; (7) the ULD 690C arrives at the forward end 639F: (8) the operator releases the "Right Fwd" button 822 to cause the ULD 690C to stop; (9) the operator then flips the "ULD Select." switch 818 to the forward position 818A to fine tune the parking of ULD 690C which would no longer be isolated; (10) the operator may then flip the "ULD Select" switch 818 back to the aft position, to move next ULD 690D from the handoff area 668 towards the forward end 639F of the cargo compartment 613.

The control of the doorway area by the MCP 632 operates in a very similar manner to the handset's 800 control of the Main Bay Area zone 666. As discussed above, the MCP 632 has an "Area Select" switch 642 and a "Side Select" switch 644. Once an MCP-controlled ULD, such as ULD 690F in FIG. 11A, is selected and has been moved so that it is isolated, then all other MCP-controlled ULDs, such as ULDs 690E are immobilized regardless of the position of the MCP's "ULD Select" switch 642 until ULD 690F either exits the cargo compartment 613 or is moved to either end of the MCP-controlled area (e.g., the MCP's first zone 662 or second zone 664, depending on the setting of the "Main Bay Control" mode switch 648).

Likewise, once a new ULD is brought through the doorway 610 into the cargo compartment 613, all other ULDs in the area selected by the MCP's "Area Select" switch 642 are immobilized, regardless of the position of the MCP's "ULD Select" switch 642. For example, if the MCP's "Main Bay Control" switch 648 was set to "Wireless Remote" then when a new ULD was brought into the cargo compartment 613, all ULDs in the doorway and adjacent area, i.e., area 664, would be immobilized since area 664 is the area selected for control by the MCP 632. On the other hand, if the MCP's "Main Bay Control" switch 648 was set to "MCP" then when a new ULD was brought into the cargo compartment 613, all ULDs in the entire cargo compartment 613 would be immobilized since the MCP 632 was set to control the entire cargo compartment 613, i.e., area 662.

In a similar vein, which ULD is selected for movement by the MCP 632 is determined by a three simple factors: (1) The MCP control area is set by the "Main Bay Control" switch 648; (2) which end of that control area to find the ULD to move is selected by the MCP's "Area Select" switch 642; and (3) which ULD to move is decided by the two level hierarchy previously explained for the handset 800 above. This algorithm allows control of the cargo compartment 613 to be divided between the handset 800 and the MCP 632, or, be totally controlled by the MCP 632. It also allows for switching between having one control zone 662 and having two control zones 664, 666. This flexibility allows the cargo loading procedure to be adapted as required. It also allows loading the entire cargo compartment 613 without the handset 800 in the event all handsets 800 are lost or dysfunctional.

As new ULDs are brought through the doorway 610 into the cargo compartment 613, their sizes are ascertained by how many PDUs they cover. This allows the size of all ULDs to be known to the MCU 630, as they move through the cargo compartment 613. As a consequence, the MCU 630 of the cargo loading system is able to track and record the location and size of each ULD, understands which ULD is to be moved at any given instant, and thus turn on the appropriate and proper number of PDUs to move a given ULD. If, for some reason, the system does not know a ULD's size at some point in time, the ULD is assumed to be a smallest size ULD. However, if the ULD does not move in a predetermined amount of lime then it is determined to be a larger ULD and additional PDUs are turned on.

There are several methods of calculating an estimated size of a given ULD when it is loaded onto the aircraft. The first method uses the time it takes from when a PDU's ULD sensor is first covered by the ULD being loaded to the time it is uncovered. Knowing the rotation speed and the diameter (and hence the circumference) of a PDU wheel, a simple "time×speed=distance" calculation can be done. It should be noted that when this first method is used, the timer must be stopped when the PDU is stopped by the operator and reversed if the ULD is backed up. This method will have error introduced if the PDUs slip or "scrub". However, once the calculation is complete, the estimated container size can be cross-checked against a table of valid ULD sizes before a final decision is made as to what size the ULD is and then have that value stored. The second method of determining the size an ULD as it is loaded is by noting how many PDU ULD sensors it covers and by knowing the distance between the PDUs being used to make this distance calculation. This method is easier and faster to calculate than the time/speed-based first method but is susceptible to quantization error since a ULD could be just short of a PDU ULD sensor on both ends and so an error of almost 50% could result. Again, the estimated container size can be cross-checked against a table of valid ULD sizes. A third method, which is a hybrid of the first and second methods, uses the known distance between covered PDU ULD sensors and the time/speed method to calculate the amount of ULD between covered and uncovered PDU ULD sensors.

Regardless of how an estimated size of an ULD is calculated, the MCU 630 may be configured to compare the estimated size against a table of known ULD sizes, before finally determining the actual size of the ULD and making a decision on what ULD size to store in memory. All size calculation, methods could be recalculated as the ULD moves through the compartment to increase confidence in the ULD size calculation. Thus, the system may calculate a plurality of estimated sizes of the same ULD. The MCU 630 may be configured to reject an estimated size which varies significantly from the remaining estimated sizes of the plurality of estimated sizes. In one embodiment, an estimated size may be considered to vary significantly from, the other "valid" estimated sizes if it differs from a sample average of all the estimated sizes by more than one standard deviation. In other embodiments, well-known clustering techniques, distance measures, and the like, may be used to establish what constitutes "varying significantly" to ensure that "abnormal" estimated sizes are ignored. The remaining estimated size calculations may then be averaged. Given sufficient valid estimated sizes of the same ULD, a thus-calculated new average may be compared with other known ULD sizes already in a table comprising such known ULD sizes. If the new average differs considerably (e.g., as determined by well-known clustering techniques, distance measures, and the like) from other known ULD sizes already in the table, the new average may then be added as a new size in the table of known ULD sizes. In this manner, the MCU 630 automatically adds the new average to the table of "known" sizes stored in memory associated with the MCU 630. The location of a given ULD in the aircraft cargo bay can be tracked by using the PDU ULD sensors as the ULD moves through the compartment and recording that information, in memory associated with, the MCU 630.

In the embodiment described above, the MCU 630 is configured to estimate the size of an ULD based on information received from one or more PDUs. In another embodiment, a PDU may be configured to estimate the size of an ULD, and then communicate this information to the MCU 630. The PDU can determine ULD size based upon the speed of its wheel, and the amount of time the PDU was running while it was covered.

Figure 12:
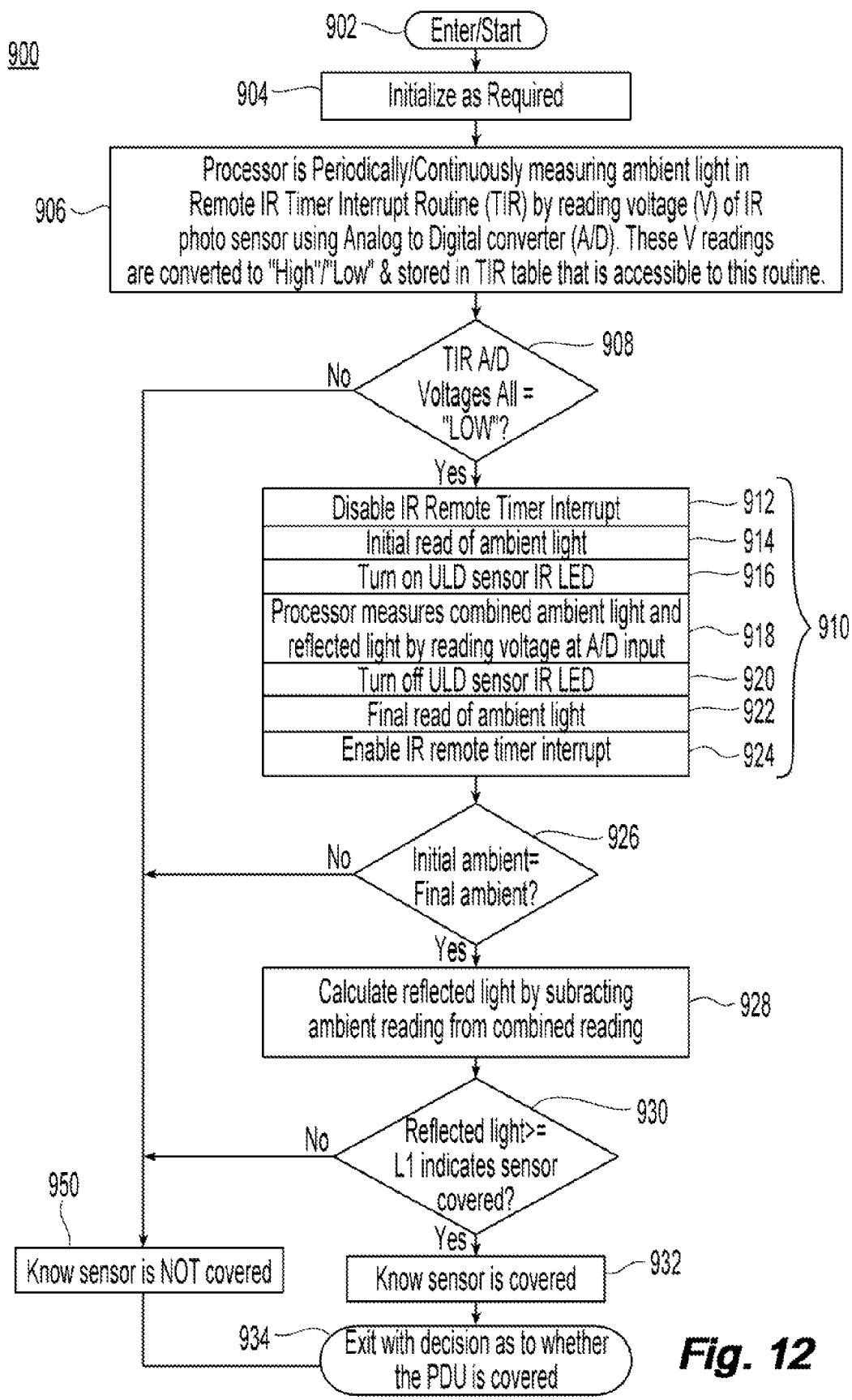
FIG. 12 shows a flow chart showing how a PDU determines whether or not it is covered, even though its light detector may receive IR signal energy from a wireless IR remote handset.

FIG. 12 presents a flow chart of the software routine 900 executed by a PDU processor 372 to determine whether or not that PDU is covered. Since an ULD moves at roughly 1 ft/sec, a 10 foot ULD passing over a PDU covers that PDU for about 10 seconds. Thus, the routine 900 can be executed relatively infrequently. In a preferred embodiment, the routine is simply part of the PDU's main software loop, though it may instead be invoked via a timer interrupt. Regardless of how often the routine 900 is executed, the PDU processor 372 executes it sufficiently fast to ensure that there is very little impact on overall PDU performance.

In step 902, the routine commences and in step 904, an initialization sequence is entered which saves and/or sets registers, values, pointers, etc. Initially, the PDU's light source 357 is turned off.

As explained in step 906, a periodically invoked IR Signal Timer Interrupt Routine (IRSTIR) suspends whatever the processor 372 is doing, and measures light received at the PDU light detector 358, by reading a voltage (V) at the output of the A/D converter 370. In one embodiment, the IRSTIR is invoked every T=500 μsec, or at a rate of 2000 Hz. These ongoing voltage readings are stored in an IRSTIR buffer stored in a memory 374 of the PDU. Only a predetermined number of the most recent of these A/D converter 370 readings are retained in the IRSTIR buffer i.e. the oldest reading is overwritten by the newest reading. The operation of the IRSTIR is described more fully with respect to FIG. 13.

The IRSTIR buffer, with its readings taken every T=500 μsec, is accessible to routine 900. In step 908, the PDU processor 372 checks the IRSTIR buffer to determine whether an integer number K most recent voltage readings are all "low", K in one embodiment being between 5-20 (2.5 msec-10 msec worth of data at a sampling rate of T=500 μsec). If the K most recent voltage readings are "low", one may conclude that very little light is reaching the PDU light detector 358. If the PDU processor decides that this indeed is the case, then it is assumed that either (a) the PDU is covered by a ULD thereby shielding the PDU light detector 358 from both ambient light and IR signals from the handset 800, or (b) the ambient light is just very dim. Control then proceeds to an ambient light estimation block 910.

If, at step 908, it is determined that the integer number K most recent voltage readings are not all "low", this could mean one of several things. One possibility is that the light detector 358 is receiving uneven ambient light. Another possibility is that the light sensor is receiving signal energy from the IR remote handset 800. Yet another possibility is that the light detector 358 is receiving uniform bright ambient light. Regardless of which of these possibilities is correct, it is assumed that the light detector 358 (and thus the PDU) is not covered 950.

The purpose of the ambient light estimate block 910 is to determine whether ambient light tracks with off/on/off sub-millisecond pattern of the PDU light source 357. If the ambient light does track, then light is being reflected, from the bottom of an ULD, thus signifying that an ULD is present. If no ULD covers the PDU's light detector 358, and the IR. Remote handset transmits during this testing, the measured light won't track with the off/on/off pattern of the PDU's light source 357, since the handset's IR signal waveforms (described further below) do not have the proper inter-pulse timing to mimic the PDU light source 357.

step 912 of the ambient light estimation block 910, the interrupt of the IRSTIR is disabled to ensure that program execution is not transferred to the tinier interrupt routine and taken away from this program during this short, but critical time. There is a small chance that IR signals from the handset 800 may be lost when the IRSTIR interrupt is disabled. However, since the buttons on the handset 800 are to be continuously activated to activate an ULD and IR commands from the handset 800 are repeated, the PDU will eventually receive the complete IR command within milliseconds.

In step 914, an initial ambient light reading at the output of the A/D converter 370 is taken with the light source 357 off. In step 916, the light source 357 is turned on, and in step 918 a combined light, reading at the input of the A/D converter 370 is taken. The combined light reading measures the combined ambient and reflected light (reflected light only if an ULD is overhead). In step 920, the light source 357 is turned off, and in step 922 a final ambient light reading at the output of the A/D converter 370 is taken. In step 924, the interrupt of the IRSTIR is once again enabled, and control proceeds to step 926.

in step 926, a determination is made as to whether the initial ambient light reading equals the final ambient light reading. If they are equal, then it is still possible that the PDU is covered, and control goes to step 928. If, on the other hand, they are not equal, it is assumed that the light detector 358 (and thus the PDU) is not covered 950 since, if an ULD was overhead for both the initial and the final light readings, the light received at the light detector 358 would have been "stable/equal" for the few milliseconds or less that these reading take. In addition, some margin of error would be allowed for the term "stable/equal".

In step 928, the reflected light is calculated by subtracting the ambient light reading from the combined light reading. In step 930, a determination is made as to whether the calculated reflected light exceeds a first light threshold L1, thereby indicating that the light sensor 357 was indeed, covered. If the calculated reflected light exceeds the first light threshold L1, then the processor knows that the sensor was covered 932. If, on the other hand, the calculated reflected light does not exceed the first light threshold L1, it is assumed that there was no reflection and hence, the light detector 358 (and thus the PDU) is not covered 950.

At step 934, routine 900 is exited and the PDU's processor 372 knows whether or not it is covered. This information may then be formatted into a message packet, along with other status information, a command information signal derived from a valid IR command signal from the handset, and other data. This message packet is then sent to the MCU 630 in accordance with the protocol of the wired communication buses 652, 654, 656, 658.

Figure 13:
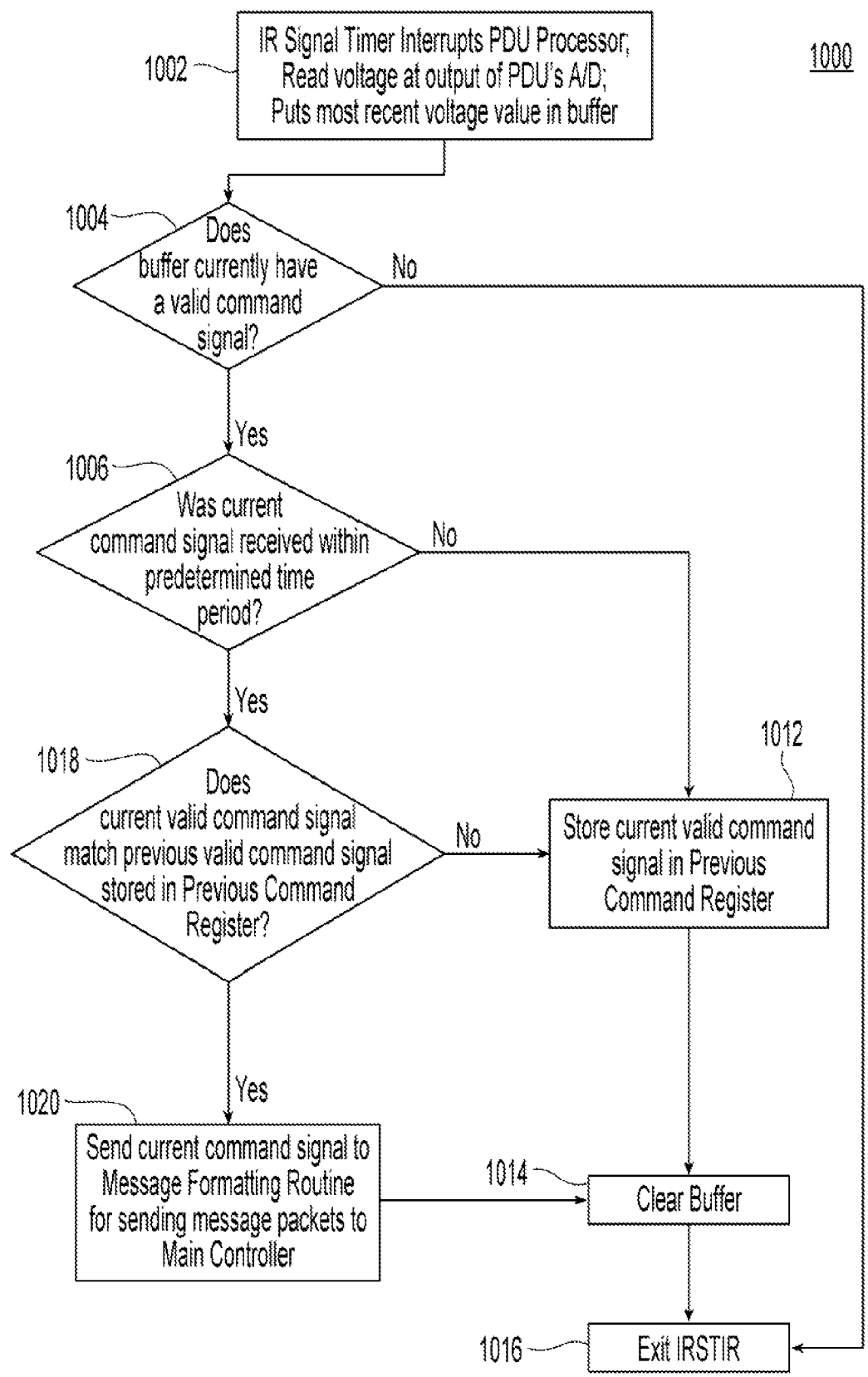
FIG. 13 illustrates the processing of IR signals by the PDU.

FIG. 13 presents a flow chart of the IR Signal Timer Interrupt Routine (IRSTIR) 1000. In step 1002, the timer times out and interrupts the processor 372. The processor state is stored and the voltage at the output of the PDU's A/D converter 370 is read and stored in the IRSTIR buffer.

In step 1004, the buffer is examined to determine whether a valid IR command signal, has just been, completed (in light of the last "bit" received by the PDU from the handset 800, as discussed below), and is currently in the buffer. If no valid IR command signal has just been completed, the IRSTIR 1000 exits 1016. If, however, a valid IR command signal has just been completed, control flows to step 1006.

Consecutive valid duplicate IR command signals, e.g., from a button on the handset remaining activated, must be received at a PDU before a command information signal is sent to the MCU 630. A Previous Command register, which in one embodiment comprises a portion of memory 374 associated with the PDU, is provided to store an immediately previously received valid IR command signal, in step 1006, a check is made to determine if the just-completed valid IR command signal arrived within a predetermined time period, e.g., within a predetermined number of bit-times after receipt of a valid IR command signal in an immediately preceding transmission of bits from the handset 800. If the just-completed valid IR command signal did not arrive within the predetermined time period (i.e., immediately following a preceding valid IR command signal) then, in step 1012, the just-completed valid IR command is stored in the Previous Command register, and this is followed by step 1014 where the input buffer is cleared and step 1016 where program execution exits the IR Signal Timer interrupt Routine 1000. If, however, at step 1006, the just-received valid IR command signal arrived within the predetermined time period, control flows to step 1018.

In step 1018, a check is made to see if the just-received valid IR command signal matches the previously received and stored valid IR command signal. This cheek is made to ensure that no IR signal command from the handset 800 is sent on to the MCU 630 unless it has been repeatedly received and validated by the PDU. If, at step 1018, the just-received and the previous valid IR command signals match, then in step 1020, the current command signal is sent to a Message Formatting Routine which, like the IRSTIR, also resides in the PDU. The Message Formatting Routine formats the valid IR command signal into a command information signal, for incorporation into a message packet for transmission to the MCU 630.

The command signal from the handset 800 may be accompanied by handset status information such as bits encoding the appropriate/required handset's DIP switch settings, the status of handset's buttons, and handset error conditions, e.g., low battery, malfunctioning LED, etc. This handset, status information is then incorporated into the message packet: for transmission to the MCU 630. The command portion of the handset message packet (e.g. an operator activated "Aft Fwd" button, etc) is utilized by the MCU 630 (along with other pertinent information) to make ULD movement decisions (i.e. to issue PDU drive commands). The handset status information portion of the handset 800 message packet may also be forwarded via a PDU to the MCU 630. The MCU 630 may then forward some or all of the handset status information to an onboard aircraft maintenance computer 684 (see FIG. 7), which may keep track of failures, error codes and the like for later retrieval by maintenance personnel. In this manner, the system may keep track of such things as low battery in handset, bad IR LED in handset, and so forth. In addition, or alternatively, the MCU 630 may, either automatically or upon request, cause some or all of the handset status information to be displayed on an associated display 686 within the aircraft cargo bay.

After the valid IR command signal is formatted in step 1020, control flows to step 1014 to clear the buffer and the IRSTIR 1000 exits at step 1016. The IRSTIR 1000 is reentered continuously at a periodic rate in accordance with the timer setting to see whether a valid command signal is received.

If, at step 1018, it is determined that the just-received valid IR command signal does not match the previously received valid IR command signal (which is stored in the Previous Command register), then control proceeds to step 1012 where the current valid IR command signal is stored into the Previous Command Register. After this, at step 1014, the input buffer is cleared and the IRSTIR exits at step 1016. It should be noted here that step 1014 ("clearing" the buffer) is presented to ease understanding of the process. In actuality, the buffer does not need to be cleared since the newest incoming bit overwrites the oldest bit in the buffer and so the buffer always is full, of some bit pattern. Furthermore, as discussed below, the buffer bit pattern is decoded from the oldest bit to the newest bit to ensure that only a truly valid handset IR command signal is accepted. This ensures that bits left over from a previous valid IR command signal (or from a garbled invalid IR command signal) are not combined with bits from an incoming new IR command signal and recognized as valid unless and until the entire valid command bit pattern was received. This continuous overwriting process is how a valid IR command signal, may be detected without any buffer "clearing" in the "No" branch of 1004 when no data is being received at first, and valid data is later received.

In the foregoing discussion, the Previous Command register was discussed as thought it were separate from the input buffer. It should be understood however, that in some embodiments, the Previous Command register may simply be a portion of the input buffer. In such case, the IRSTIR 1000 is configured to check whether the most recently received stream of bits occupying a first portion of the input buffer matches a previously received stream of bits occupying a second portion of the input buffer. Also in such case, the input buffer should have a length at least as great as twice the length of a valid IR command signal plus the number of "blank" bits constituting a predetermined gap between successive transmissions of the same IR command signal from pushing a button on the handset 800.

Figure 3B:
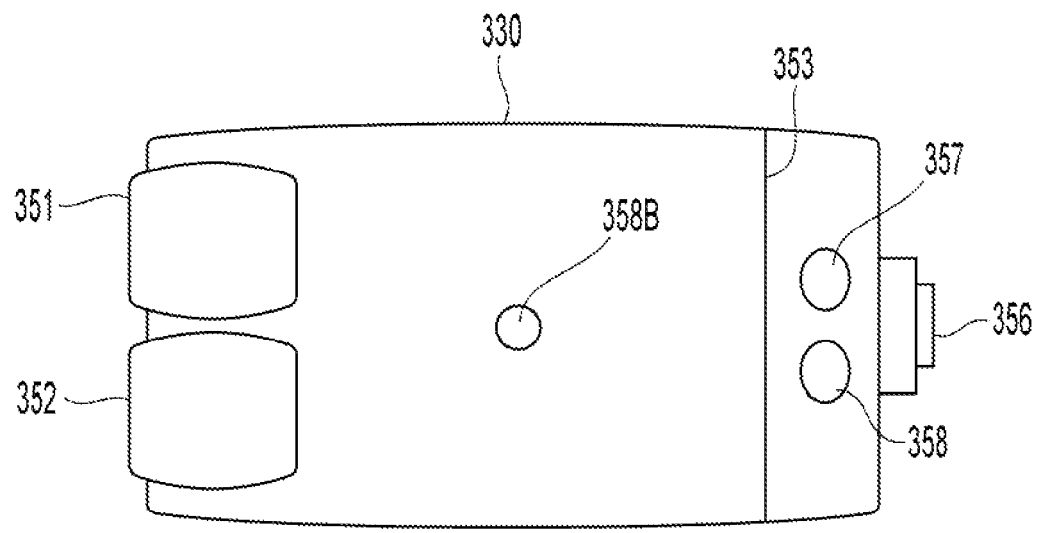
FIG. 3B is a top view of a PDU in accordance with another embodiment of the present invention, in which the PDU has two light sensors.
Figure 4B:
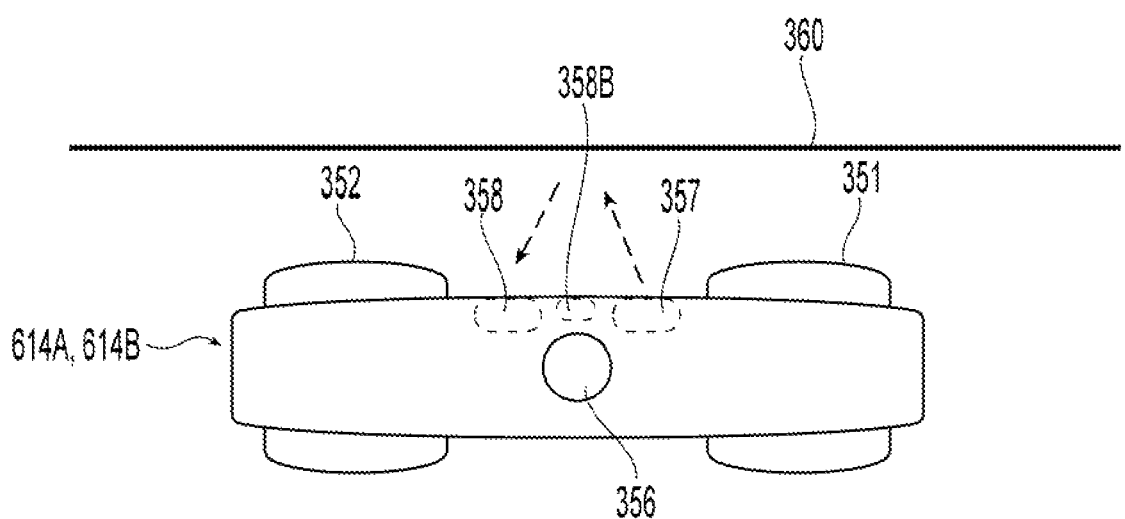
FIG. 4B is an end view of the PDU seen in FIG. 4B.
Figure 5B:
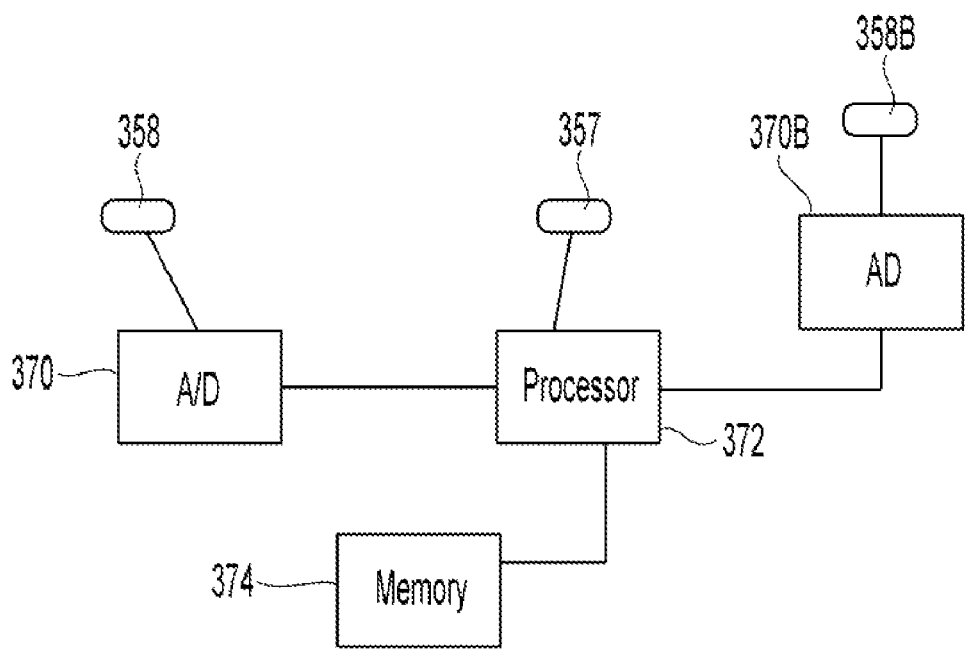
FIG. 5B is a block diagram of the electronics of the PDU seen in FIG. 3B.

Also, in the description above of FIGS. 3A, 4A and 5A, it was assumed that each PDU has a single light detector 358 which is used for detecting reflections from an ULD and also for detecting the light energy from the handset 800. Thus, the PDU processor 372 receives output from the single light detector 358 in response to reflected light, and also receives output of the single light detector 358 in response to coded light signal. In an alternate embodiment, however, each PDU may be provided with two light detectors, one for detecting reflections from an ULD and another for detecting light energy from a handset 800. Thus, in the PDU embodiment of FIGS. 3B, 4B and 5B, a separate second light detector 358B is used to receive light from a wireless remote handset. As seen, in FIG. 5B, when such a separate light detector is used, its output is connected to a separate A/D converter 370B, and the output of the A/D 370B is applied to the processor 372. In a first variation of this embodiment, the wavelength of light to which the first light detector 358 responds differs from the wavelength of light to which the second light detector 358B responds. Thus, the light source 357 and the first light detector 358 use one wavelength while the handset 800 and the second light detector 358B use a second wavelength. In a second variation of this embodiment, the wavelength of light to which the first light detector 358 responds is substantially the same as the wavelength of light to which the second light detector 358A responds, in which ease the light source 357 and the handset 800 use the same wavelength.

Figure 14:
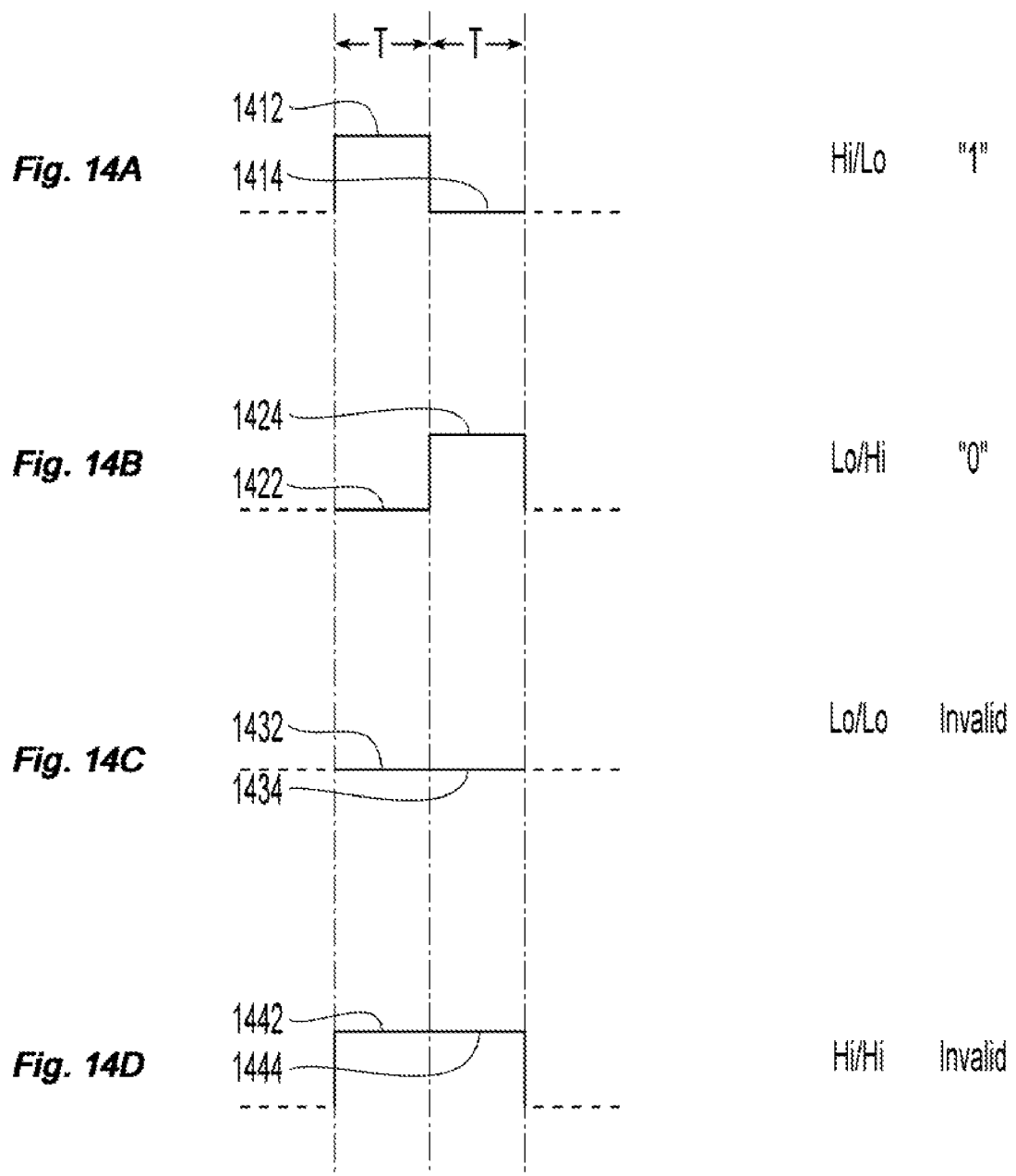
FIGS. 14A-14D presents exemplary waveforms emitted by an IR wireless handset.

FIG. 14 presents exemplary waveforms explaining the structure of the bits emitted by the handset 800 in an IR command signal. Since the PDU's light detector 358 receives signal energy from both ambient light and the handset 800, IR command signals from the handset 800 should not be mistaken, for ambient light, and vice versa. This requires that each bit from the handset include a transition in the light level.

FIG. 14A shows a "1" bit, which comprises a high pulse 1412 of duration T (handset transmitting signal energy) followed by a low pulse 1414 of the same duration (handset transmitting no signal energy). Although this simple high-to-low, or "Hi/Lo" transition pattern can occur in random ambient lighting, the pattern required to create a valid command requires many of these bits to occur consecutively. This complex pattern along with other validating methods, e.g., parity, start & stop bits, duplicate consecutive commands, etc., insure that only a truly valid command is accepted by the PDU. Likewise FIG. 14B shows a "0" bit, which comprises a low pulse 1422 of duration T (handset transmitting no signal energy) followed by a high pulse 1424 of the same duration (handset transmitting signal energy).

in contrast to FIGS. 14A and 14B, FIGS. 14C and 14D show two invalid (i.e., "non-bit") waveforms. In the waveform of FIG. 14C, the two successive low readings 1432, 1434 may simply indicate uniform ambient light, and so, in this embodiment, the Lo/Lo sequence is considered to be non-IR signal. Similarly, in the waveform of FIG. 14D, the two successive high pulses 1442, 1444 may also indicate uniform ambient light, and so the Hi/Hi pulse sequence is also considered to be non-IR signal.

Figure 15:
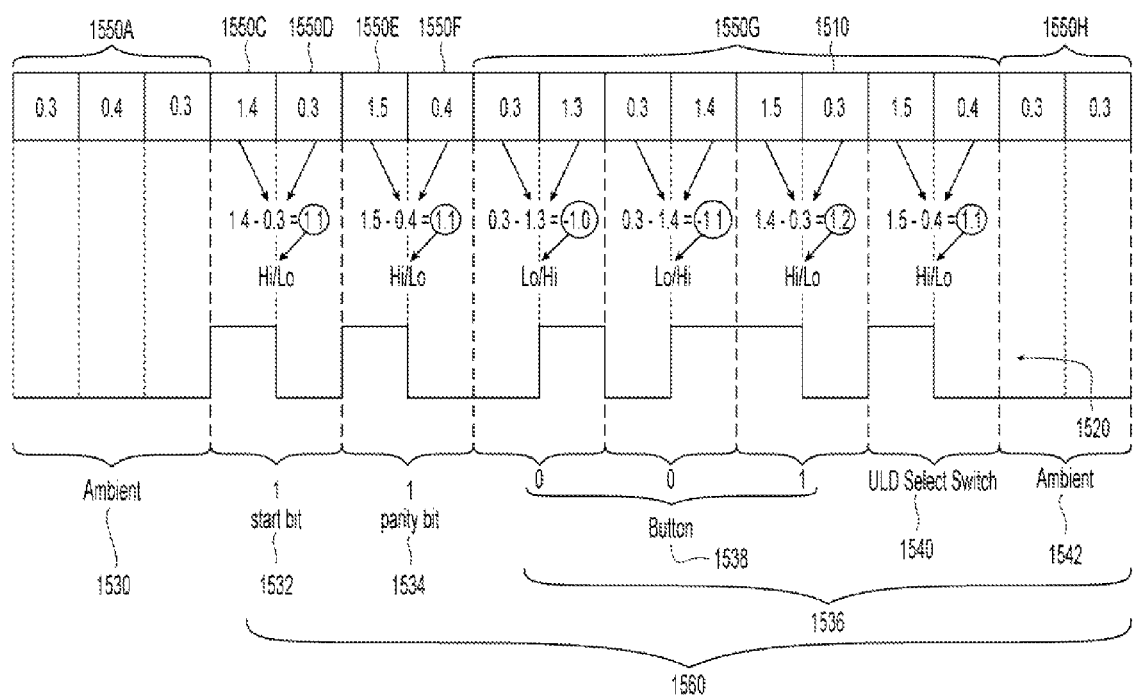
FIG. 15 illustrates the process for identifying bits in a valid IR command signal.

FIG. 15 illustrates how the values in an exemplary IRSTIR buffer 1510 are identified as bits of a valid IR command signal. As discussed above, the IRSTIR buffer 1510 stores digital values obtained by sampling the output of the PDU's A/D converter 370 every T=500 μsec. In one embodiment, values in the range of 0.0-0.5 volts are consider low, or no IR signal energy, while values above 1.0 or so are considered high, or IR signal energy. The actual voltage that would be considered a "Lo" or a "Hi" would be adapted in real time to the ambient light. In one implementation of this ambient light adaptation, a window of the N most recent readings are used, and the lowest and highest readings within that window are recorded. A "Lo" is thereafter considered to be the lowest reading plus a percentage of the range between the lowest and highest readings, while a "Hi" is thereafter considered to be the highest reading minus a percentage of the range. A minimum voltage difference between a "Hi" and a "Lo" may also be required so that "Hi"s and "Lo"s cannot be created out of "uniform" light. And since this algorithm is used on readings stored in memory, the PDU's processor 372 may be configured to adjust previous conversions of voltages to "Hi"s and "Lo"s. This adaptive algorithm should make receiving valid IR command signals very robust even in changing light conditions.

Since, as discussed with respect to FIG. 14, the only valid bits from the handset 800 are based on a pair of pulses having either a "Hi/Lo" or a. "Lo/Hi" transition, the IRSTIR 1000 looks for such a transition by taking the difference of successive pulses, and comparing this difference to a predetermined threshold magnitude of T1. In this embodiment, T1 is 0.7, and so only inter-pulse differences greater than T1=0.7 are considered to be indicative of a valid bit. It is understood, however, that this inter-pulse difference could be adaptively changed, in addition, in this embodiment, valid IR command signals from the handset begin with a start bit of "1", and so the IRSTIR 1000 initially seeks a "Hi"/"Lo" transition, which necessarily begins with a "Hi" value. In the exemplary IRSTIR buffer 1510, since the first three bits, shown generally as 1550A are all low, their inter-pulse differences are very small (e.g., 0.4−0.3=0.1) and so these bits are considered ambient light 1530 and, if found in the "body" of a bit stream, would indicate a non-valid command.

Still referring to FIG. 15, the IRSTIR ultimately finds the pulse 1550C (which has a "Hi" value of 1.4) and obtains the following pulse 1550D (which has a "Lo" value of 0.3). The IRSTIR 1000 subtracts the two values 1.4-0.3=1.1 which is larger than the threshold T1 magnitude of 0.7. And since the transition from pulse 1550C to 1550D was "Hi"/"Lo", the two pulses together are considered to form a "1" bit which, since it happens to be the first bit found, is treated as a "start" bit 1532. Start bit 1532 is stored in a particular first bit position in a signal memory associated with the PDU for reconstructing the IR command signal.

The IRSTIR 1000 then processes the next two pulses 1550E, 1550F in the buffer 1510. Pulses 1550E and 1550F have values 1.5 and 0.4, respectively, and these are deemed in a similar manner to form a "1" bit. In this example, the second bit is considered a parity bit 1534 for the IR command signal and is stored in a particular second bit position in the signal memory.

The IRSTIR 1000 then processes the buffer's following eight pulses, shown generally as 1550G, and identifies four additional hits, which represent message bits 1536. The first three bits 1538 of the tour message bits 1536 encode which of the 7 buttons 822, 824, 826, 828, 832, 834, 836 on the handset 800 was pushed. The fourth message bit 1540 represents the setting of the "ULD Select" switch 818.

In the embodiment shown in FIG. 15, the start bit 1532, the parity bit 1534 and the four message bits 1536 comprise an entire valid. IR command, signal 1560 sent by the handset 800. Even if the button on the handset 800 remains activated, there is a predetermined gap before the next transmission of the same IR command signal. The IRSTIR 1000 looks for such a gap by examining the following pair of pulses 1550H to further ensure that the data just received is part of a valid command. The length of the gap is not critical, though its length should be consistent between repealed transmissions, in some embodiments, the gap between repeated transmissions may even exceed the duration of the IR command signal. Also, while in the embodiment presented in FIG. 15 an IR command signal is described as having 6 bits, it is understood that in other embodiments an IR command signal may have other numbers of bits. For instance, if one or more stop bits or additional bits to reflect: the settings of additional switches are present, the IR command signal may constitute 8 or even more bits.

Figure 16:
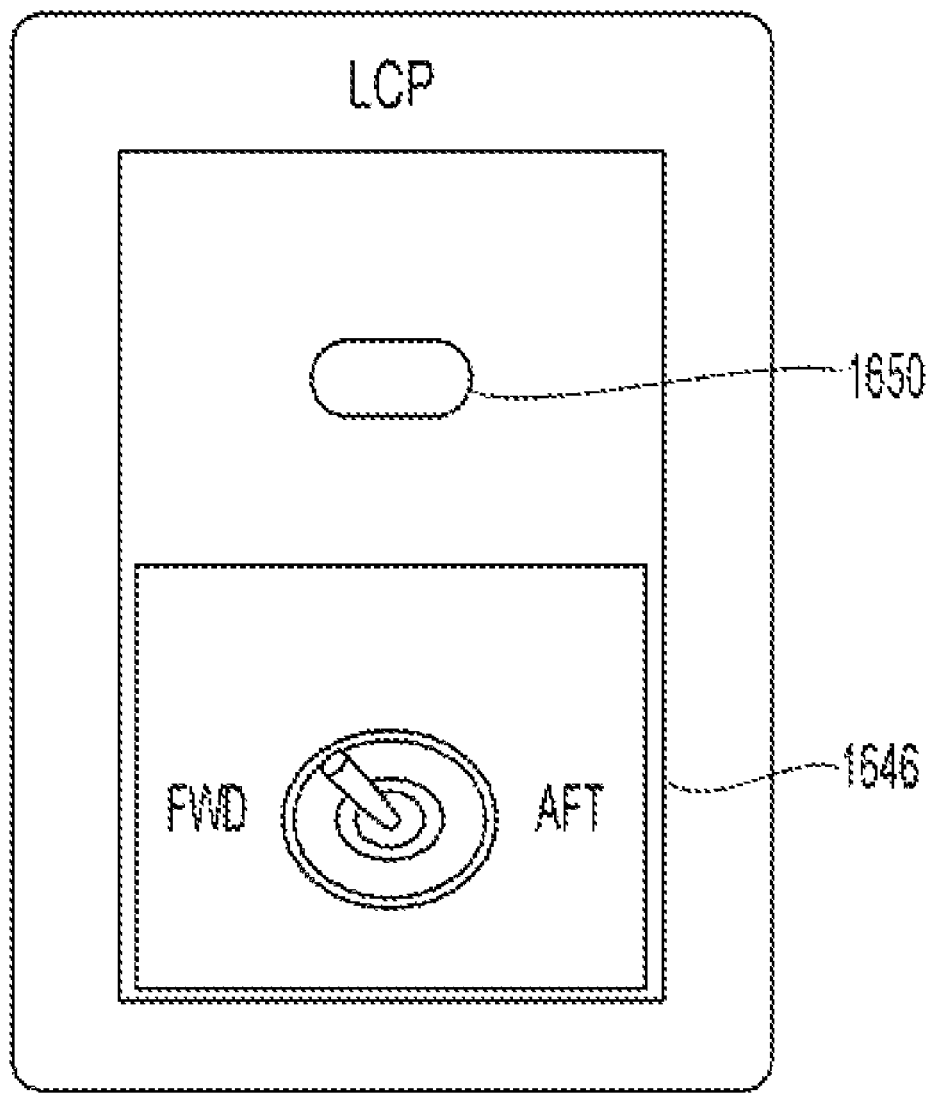
FIG. 16 depicts a local control panel in accordance with one embodiment of the present invention.

FIG. 16 shows a simplified illustration of a modified Local Control Panel (LCP) 1634 in accordance with one embodiment of the present invention. The modified LCP 1634 comprises a switch 1646 and may also include other standard buttons, switches, indicators and the like. However, the modified LCP 1634 also comprises a light detector 1650 configured to receive and process light signals from a handset and send these to the MCU 630, much as described above with, respect to the PDU 614a, 614b. It is thus understood that the modified. LCP 1634 has a light defector 1650 coupled to a local control panel processor (not shown) and is configured to receive and process an incoming light signal. Furthermore, the local control panel processor is configured to determine whether a coded light signal received at the light detector 1650 comprises a valid command signal from the handset to be provided to the MCU 630 of the cargo loading system. In addition, the local control panel processor is configured to provide an appropriate first command information signal to the MCU 630, if the received coded light signal is determined to be a valid command signal from the handset.

Figure 17:
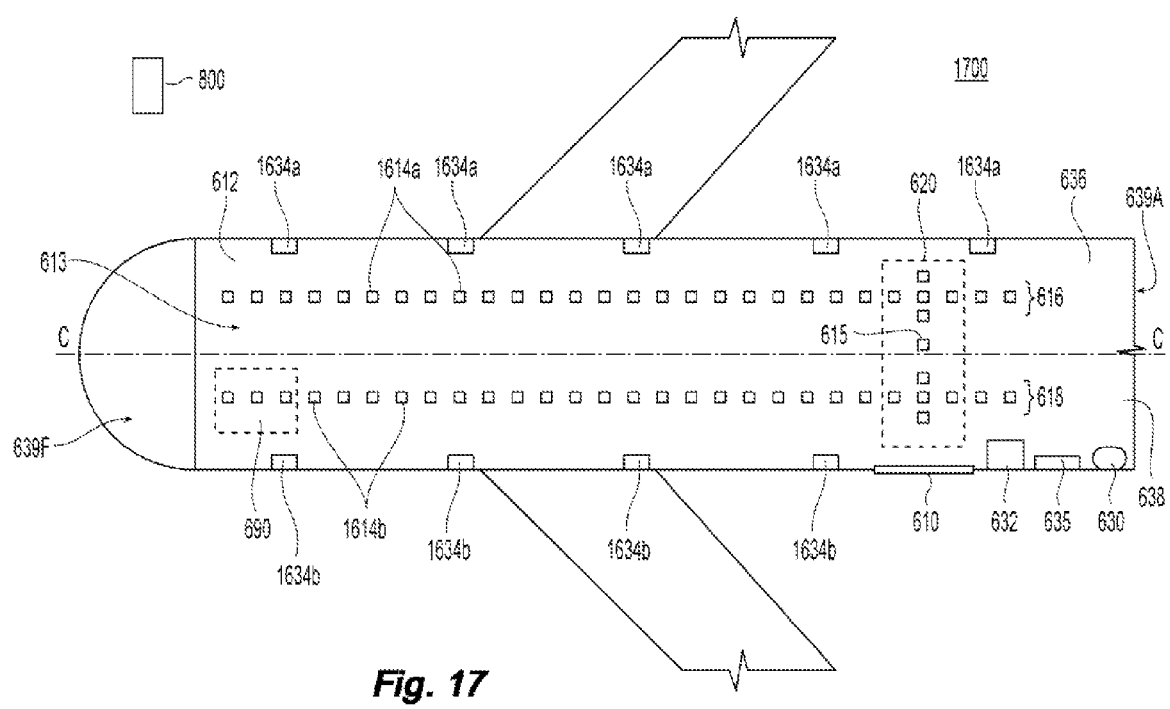
FIG. 17 illustrates a layout of a cargo aircraft in accordance with a second embodiment of the present invention.

FIG. 17 illustrates a possible layout of an air cargo aircraft 1700 having an air cargo loading system employing modified LCPs 1634a, 1634b. As seen in FIG. 17, the modified LCPs 1634a, 1634b may be arranged at spaced intervals on both sides of the air cargo deck, and along the full length thereof. In the embodiment shown, a limited number, e.g., no more than live or six, of such modified LCPs 1634a, 1634b are employed, though smaller or larger numbers of such LCPs may be used on each side, as needed. It is understood that the LCPs near the doorway may be somewhat more complicated that the LCP 1634 of FIG. 16, since the doorway LCPs may be equipped with further controls to steer and turn an ULD as it enters the cargo hold.

In one embodiment of an air cargo loading system corresponding to the layout seen in FIG. 17, the power drive units 1614a, 1654b may be similar to power drive units 614a, 614b disclosed above and thus be able to receive and process the same light signals as those emitted by handset 800. Thus, in said one embodiment, the air cargo loading system corresponding to the layout seen in FIG. 17 may be provided with both PDUs and LCPs that are capable of receiving and processing light signals from a handset to control the PDUs. In another embodiment, only the LCP's and none of the PDUs, are provided with the ability to receive and process the light signals from the handset 800.

There are potentially a number of advantages of using an IR wireless remote handset to communicate with the MCU 630 in lieu of local control panels.

First, there may be advantages with installation costs. Each LCP and its associated wiring costs several thousand dollars when the cargo loading system is installed. In contrast, the costs of two or three handsets would roughly be an order of magnitude less. Given that a main cargo deck of an aircraft may have sixteen or twenty, or even more such LCPs, the cost savings may be considerable.

Second, there may be advantages in saving time and associated personnel costs during loading and unloading operations. The cost savings is realized because an operator does not have to walk to predetermined locations along the length, of the cargo compartment where the LCPs are mounted. Instead, an operator can simply press a button on a handset so Song as he/she is in a line of sight with any PDU.

Third, there may be cost savings associated with eliminating the weight of the LCPs. The reduction in weight realized by eliminating several LCPs, each weighing on the order of 10 lbs or so, and associated wiring, potentially translates into substantial fuel savings per flight, and/or increased payload capacity for the aircraft, or both. And this can add up to several thousand dollars in cost savings over the lifetime of the aircraft.

In addition, there are potential safety benefits associated with eliminating the LCPs in the air cargo compartment and using IR remote handsets. First, an operator is no longer required to stand at the side of the cargo compartment where the LCP's are mounted and may instead move to the best vantage point while activating the PDUs. Second, wireless handsets do not have tethers which may interfere with personnel or the ULDs. Next, embodiments requiring that release of a button causes cessation of PDU activation may provide a "fail-safe" feature that prevents injury to the ULDs, the air cargo compartment and to the operators. Finally, having the 'system stop' button on the wireless handset instead of on the LCPs means that the operator has the power to instantly stop the entire system in his or her hand, instead of first having to go to the nearest LCP.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A power drive unit (PDU) for an air cargo loading system in which a controller is connected to a plurality of such PDUs via a wired network and is instructed via wireless remote handset to activate one or more of said PDUs in response to a coded light signal, the PDU comprising:
   a light source configured to emit light;
   at least one light detector configured to receive light; and
   a PDU processor coupled to said at least one light detector and programmed to:
      take into account ambient light to determine whether a Unit Load Device (ULD) is overhead, based at least in part on reflected light received by said at least one light detector after illuminating an underside of the ULD by said light source;

determine whether a coded light signal received by said at least one light detector comprises a command signal to be provided to the controller; and output an appropriate first command information signal, if the coded light signal is determined to be a command signal.

2. The power drive unit (PDU) according to claim 1, wherein:

the PDU processor is further programmed to output the command information signal only if at least two consecutive, identical, command signals are received at a light detector.

3. The power drive unit (PDU) according to claim 1, comprising a single light detector coupled to said PDU processor, said PDU processor receiving output of said single light detector in response to said reflected light, and also receiving output of said single light detector in response to said coded light signal.

4. A method of issuing control signals from a controller associated with an air cargo loading system installed in an air cargo compartment of an aircraft to at least one power drive unit (PDU), the air cargo loading system including a plurality of PDUs in accordance with claim 1 connected via a wired network to said controller, the method comprising:

activating a first button on a first wireless remote control handset to thereby create a first coded light signal;

receiving the first coded light signal at a light detector of one of said plurality of PDUs;

at said one PDU which receives the first coded light signal:

determining whether the received first coded light signal comprises a command signal to be relayed to the controller; and providing an appropriate first command information signal to the controller, if the received first coded light signal is determined to be a command signal to be relayed to the controller; and at the controller:

obtaining the first command information signal;

determining which of said plurality of PDUs should be activated in response to the first command information signal; and sending a first PDU control signal via the wired network to activate only those PDUs that the controller has determined should be activated in response to the first command information signal.

5. The method according to claim 4, comprising:

activating PDUs in response to the first command information signal only so long as the first button remains activated and the handset continues to a transmit a command signal.

6. The method according to claim 4, wherein the plurality of PDUs are arranged in a right row and a left row along a length of the air cargo compartment, the method comprising:

activating PDUs in both rows, in response to the first PDU control signal.

7. The method according to claim 4, wherein the plurality of PDUs are arranged in a right row and a left row along a length of the air cargo compartment, the method comprising:

activating PDUs in only a first of the two rows and activating none of the PDUs in the second of the two rows, in response to the first PDU control signal.

8. The method according to claim 7, comprising:

activating a second button on a second remote control handset to thereby create a second coded light signal;

receiving the second coded light signal at a light detector of one of said plurality of PDUs;

at said one PDU which receives the second coded light signal:

determining whether the received second coded light signal comprises a command signal to be relayed to the controller;

if the received second coded light signal is determined to be a command signal to be relayed to the controller, sending an appropriate second command information signal to the controller; and at the controller:

interpreting the second command information signal;

determining which of said plurality of PDUs should be activated in response to the second command information signal; and sending a second PDU control signal to activate only those PDUs that the controller has determined should be activated in response to the second command information signal; and activating PDUs in only the second of the two rows and activating none of the PDUs in the first of the two rows, in response to the second PDU control signal.

9. The method according to claim 8, comprising:

activating PDUs in the first row in response to the first command information signal only so long as the first button remains activated and the handset continues to a transmit a command signal.

10. The method according to claim 4, wherein the plurality of PDUs are arranged in a right row and a left row along a length of the air cargo compartment, the method further comprising:

providing a handset that is configured to create coded light signals which, when interpreted by the controller, can result in the activation of PDUs in only one of the two rows.

11. A power drive unit (PDU) for an air cargo loading system in which a controller is connected to a plurality of such PDUs via a wired network and is instructed via wireless remote handset to activate one or more of said PDUs in response to a coded light signal from the handset, the PDU comprising:

a light source configured to emit light;

first and second light detectors;

a PDU processor coupled to the first and second light detectors and programmed to:

determine whether a Unit Load Device (ULD) is overhead, based at least in part on reflected light received by the first light detector after illuminating an underside of the ULD by said light source;

determine whether a light signal received by the second light detector comprises a command signal to be provided to the controller; and output an appropriate first command information signal, if the light signal received by the second light detector is determined to be a command signal;

said PDU processor receiving output from the first light detector in response to said reflected light, and receiving output from the second light detector in response to said coded light signal from the handset.

12. The power drive unit (PDU) according to claim 11, wherein:

a wavelength of light to which the first light detector responds differs from a wavelength of light to which the second light detector responds.

* * * * *